United States Patent
Owen

(10) Patent No.: US 12,405,338 B2
(45) Date of Patent: Sep. 2, 2025

(54) ESTIMATING CHARACTERISTICS OF OBJECTS IN ENVIRONMENT

(71) Applicant: Henry S. Owen, Medford, NJ (US)

(72) Inventor: Henry S. Owen, Medford, NJ (US)

(73) Assignee: HENRY S. OWEN LLC, Medford, NJ (US)

( * ) Notice: Subject to any disclaimer, the term of this patent is extended or adjusted under 35 U.S.C. 154(b) by 0 days.

(21) Appl. No.: 17/845,411

(22) Filed: Jun. 21, 2022

(65) Prior Publication Data

US 2023/0063346 A1    Mar. 2, 2023

Related U.S. Application Data

(63) Continuation of application No. 16/807,789, filed on Mar. 3, 2020, now Pat. No. 11,391,806, which is a continuation of application No. 15/606,230, filed on May 26, 2017, now Pat. No. 10,591,572, which is a continuation of application No. 13/865,828, filed on Apr. 18, 2013, now Pat. No. 9,664,769.

(60) Provisional application No. 61/794,426, filed on Mar. 15, 2013, provisional application No. 61/765,509, filed on Feb. 15, 2013, provisional application No. 61/752,960, filed on Jan. 15, 2013, provisional application No. 61/679,056, filed on Aug. 2, 2012, provisional application No. 61/650,521, filed on May 23, 2012, provisional application No. 61/635,058, filed on Apr. 18, 2012.

(51) Int. Cl.
| | | |
|---|---|---|
| *G01S 1/02* | (2010.01) | |
| *G01S 5/02* | (2010.01) | |
| *G01S 19/07* | (2010.01) | |
| *G01S 19/22* | (2010.01) | |
| *G01S 19/40* | (2010.01) | |
| *G01S 19/42* | (2010.01) | |

(52) U.S. Cl.
CPC .............. *G01S 1/02* (2013.01); *G01S 5/0294* (2013.01); *G01S 19/071* (2019.08); *G01S 19/072* (2019.08); *G01S 19/22* (2013.01); *G01S 5/021* (2013.01); *G01S 19/40* (2013.01); *G01S 19/428* (2013.01)

(58) Field of Classification Search
CPC ........ G01S 1/02; G01S 5/0294; G01S 19/072; G01S 19/071; G01S 19/22
USPC .......................................................... 342/458
See application file for complete search history.

(56) References Cited

U.S. PATENT DOCUMENTS

2010/0232476 A1* 9/2010 Tarlow ..................... G01S 19/22
                                                                    375/147
2011/0287778 A1* 11/2011 Levin ..................... G01S 5/0294
                                                                    342/461

FOREIGN PATENT DOCUMENTS

| CN | 1885848 A | * 12/2006 | ........... H04B 7/0845 |
| JP | 2007331888 A | * 12/2007 | |
| JP | 4270757 B2 | *  6/2009 | ........... G01C 21/206 |
| WO | WO-0045191 A2 | *  8/2000 | ........... G01C 21/206 |

(Continued)

*Primary Examiner* — Harry K Liu
(74) *Attorney, Agent, or Firm* — Snyder, Clark, Lesch & Chung, LLP

(57) ABSTRACT

Methods and systems disclosed herein may include receiving signals from a transmitter in a receiver; determine a bias of the transmitter and receiver; generating expected observations, based on the bias, corresponding to the received signals; and calculate a building height based on a power level of the received signals and a power level of the expected observations.

19 Claims, 12 Drawing Sheets

(56) References Cited

FOREIGN PATENT DOCUMENTS

WO     WO-2008062819 A1 *   5/2008  ............. G06T 17/05

* cited by examiner

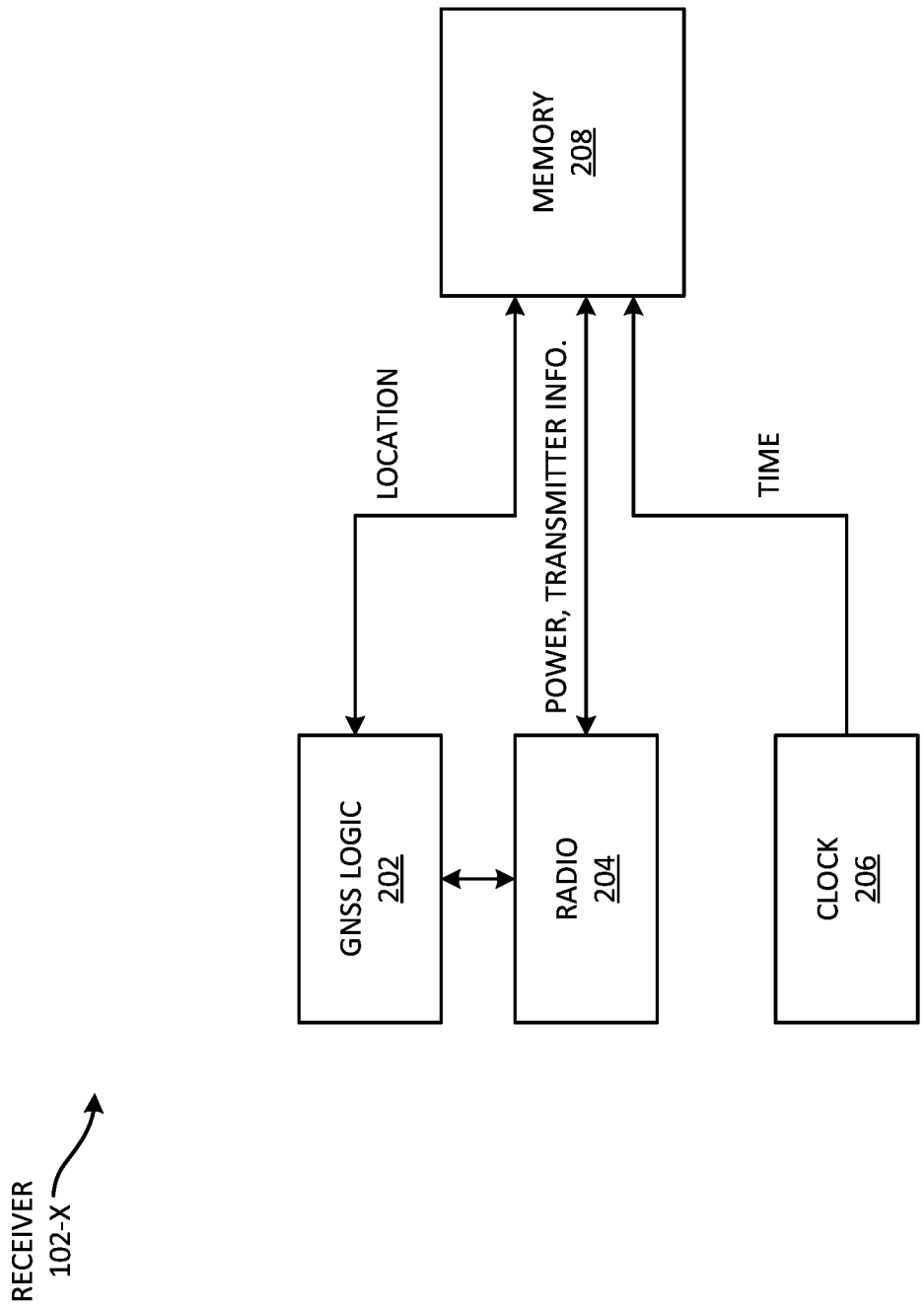

US 12,405,338 B2

ESTIMATING CHARACTERISTICS OF OBJECTS IN ENVIRONMENT

RELATED PATENT APPLICATIONS

This application is a continuation of U.S. patent application Ser. No. 16/807,789, filed Mar. 3, 2020, which is incorporated herein by reference, which is a continuation of U.S. patent application Ser. No. 15/606,230, filed May 26, 2017, which is incorporated herein by reference, which is a continuation of U.S. patent application Ser. No. 13/865,828, filed Apr. 18, 2013, which is incorporated herein by reference, which claims the benefit of U.S. Provisional Patent Application No. 61/635,058, filed Apr. 18, 2012, U.S. Provisional Patent Application No. 61/650,521, filed May 23, 2012, U.S. Provisional Patent Application No. 61/679,056, filed Aug. 2, 2012, U.S. Provisional Patent Application No. 61/752,960, filed Jan. 15, 2013, U.S. Provisional Patent Application No. 61/794,426, filed Mar. 15, 2013, and U.S. Provisional Patent Application No. 61/765,509, filed Feb. 15, 2013, all of which are incorporated herein by reference.

BACKGROUND INFORMATION

Vehicles often have navigation devices to aid occupants while traveling. Consumer electronic devices, including smart phones, often have navigation applications to aid the user while traveling. These navigation devices and applications use navigation techniques or systems, such as a global navigation satellite systems (GNSS), to determine location. In a GNSS, for example, the device or application receives signals transmitted by the satellites and determines location from the received signals. In some instances, the location determined by the GNSS may include errors. These errors may be caused by multipath, reflections, shadowing, refraction, diffraction, etc.

DESCRIPTION OF THE DRAWINGS

FIG. 2A is a block diagram of exemplary components of the receiver of FIGS. 1A and 1B;

DETAILED DESCRIPTION OF THE EMBODIMENTS

The following detailed description refers to the accompanying drawings. The same reference numbers in different drawings may identify the same or similar elements. Also, the following detailed description does not limit the invention.

One issue with navigation applications, devices, and systems is that accuracy may be reduced as a result of errors, noise, etc. For example, the accuracy of a dead reckoning navigation system may be reduced as a result of errors in the direction of travel as measured by a compass. As another example, the accuracy of GNSS positioning systems may be reduced when the signal from the one of the satellites to the GNSS receiver (e.g., the line-of-sight or LOS) is obstructed. In this case, the path from the satellite to the GNSS receiver may be obstructed by a building, reducing the signal power. In urban areas with large buildings, signals may reflect off the buildings creating multiple signals that take different paths to the GNSS receiver. As a result, when the GNSS receiver receives a signal, the propagation path length from the satellite to the mobile receiver may be increased due to reflection or diffraction around buildings. The direct path may no longer dominate, and the resulting estimated position is biased or in error. It is not uncommon in the urban environment to see significant errors in GNSS position estimates, due to multipath effects and building shadowing.

Methods and systems described below allow for the estimation of characteristics (e.g., parameters) to describe objects (e.g., buildings, foliage, atmosphere, etc.) in an environment from signals received by a receiver (e.g., a GNSS device). The parameters may include building height, building material, foliage height, foliage type, atmospheric conditions, etc. These parameters may be useful for correcting navigation errors or for any other purposes (e.g., improving communication). In one embodiment, using the signals received in a receiver (e.g., a GNSS receiver or some other generic, non-specialized radio receiver), the power level of received signals from one or more transmitters (e.g., radio frequency transmitters, such as a satellite or television broadcast transmitter) are compared to expected signals influenced by various characteristics of objects in the environment (e.g., expected signals generated by simulation and, in one embodiment, not by previous observation and/or information stored in a database). Based on this comparison, the characteristics of the objects may be estimated. In one embodiment, for example, knowledge of the two-dimensional (2D) footprint of nearby buildings and/or foliage may be used to determine the three-dimensional (3D) characteristics of nearby buildings and foliage.

Figure 1A:
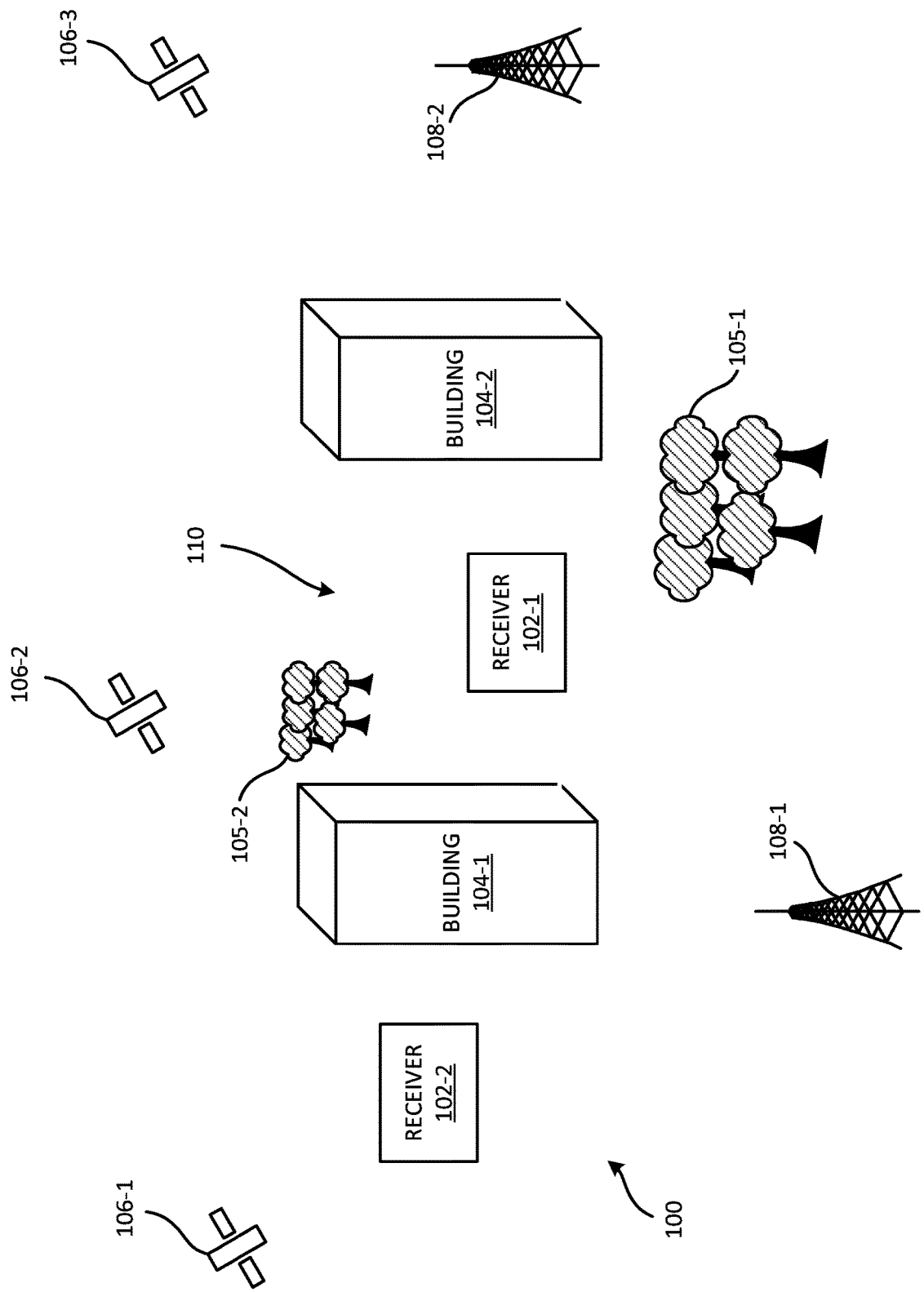
FIG. 1A is a diagram of an exemplary environment for estimating characteristics of objects.

FIG. 1A depicts an exemplary environment 100 (e.g., an urban environment with foliage) for implementing algorithms disclosed herein. Environment 100 includes buildings 104-1 and 104-2, foliage region 105-1 and foliage region 105-2, receiver 102-1 and 102-2, satellites 106-1 through 106-3, and transmitters 108-1 and 108-2 (collectively "buildings 104," "foliage regions 105," "receivers 102," "satellites 106," and "transmitters 108").

Satellites 106 may form part of a GNSS that permits receiver 102 to determine its position (e.g., on the surface of the earth). Satellites 106 are placed in varying orbits so that at any one time receiver 102 may receive signals from a number of satellites. Each satellite 106-x may transmit a coded signal with an accurate time reference to a clock, such as an atomic clock, for example. In one embodiment, receiver 102 includes a GNSS receiver and may lock onto signals from multiple transmitting satellites 106. By knowing the positions of satellites 106 and extracting time reference information from the signals, receiver 102 (e.g., if it includes a GNSS device) can calculate position, for example. The GNSS depicted in FIG. 1A may allow receiver 102 to determine its location (longitude, latitude, and altitude) to within a few meters, for example. In other implementations, the GNSS system depicted in FIG. 1A may allow receiver 102 to determine its location less accurately or more accurately.

Receiver 102 (e.g., if it includes a navigation device) may also determine its position using other methods (e.g., other than or in addition to using satellites). For example, receiver 102 may estimate its position using an odometer in a car, an inertial navigation system (e.g., speedometers, magnetometers, accelerometers, compasses, gyroscopes, etc.), dead reckoning, radio direction finding (e.g., Long Range Navigation or "LORAN"), radar, etc. Thus, in one embodiment, environment 100 may not include satellites 106 at all. Receiver 102 may estimate its location at a given point in time. Given multiple locations over a period of time, receiver 102 may estimate a track that it has traveled. Receiver 102 may use any technique to determine position and an estimated track.

In one embodiment, the signals received by receiver 102 from satellites 106 may not be used to determine an estimated track, but may received and recorded (e.g., the power level) for later use. For example, satellites 106 may broadcast satellite TV stations. Receiver 102 may determine its location using a navigation system or technique other than GNSS.

Receiver 102 may include a mobile phone, a tablet computer, a laptop, a personal digital assistant (PDA), or another portable communication device. In one embodiment, receiver 102 may include a dedicated navigation unit that does not include the additional features of a phone, laptop, etc.

Transmitters 108 may include any type of transmitter that transmits a signal that is received by receiver 102. Transmitter 108 may include terrestrial broadcast antennas that have a fixed location and transmit television signals using the Advanced Television System Committee (ATSC) standard. Transmitter 108 may include terrestrial mobile telephone cell towers, radio towers, etc. In one embodiment, the location of transmitters 108 is known (to some degree) with respect to time. Transmitters 108 may be fixed with time (such as a TV broadcast tower) or may move with time (such as a satellite).

In the example of FIG. 1A, buildings 104 create a canyon 110 that may shadow receiver 102 from satellites 106 from time to time, depending on the location of receiver 102 relative to each satellite 106-*x*. Buildings 104 may also shadow receiver 102 from transmitters 108 from time to time, depending on the location of receiver 102 relative to transmitters 108. As discussed above, when one of buildings 104 intersects the line of sight from satellite 106-*x* to receiver 102, the power level of the signal received by receiver 102 from satellite 106-*x* may be diminished. Likewise, when one of buildings 104 intersects the line of sight from antenna 108-*x* to receiver 102, the power of the signal received by receiver 102 may be diminished. Blockage and/or interference by foliage 105 may similarly cause changes in received power levels (or other characteristics) of signals from transmitters 106 or 108.

Figure 1B:
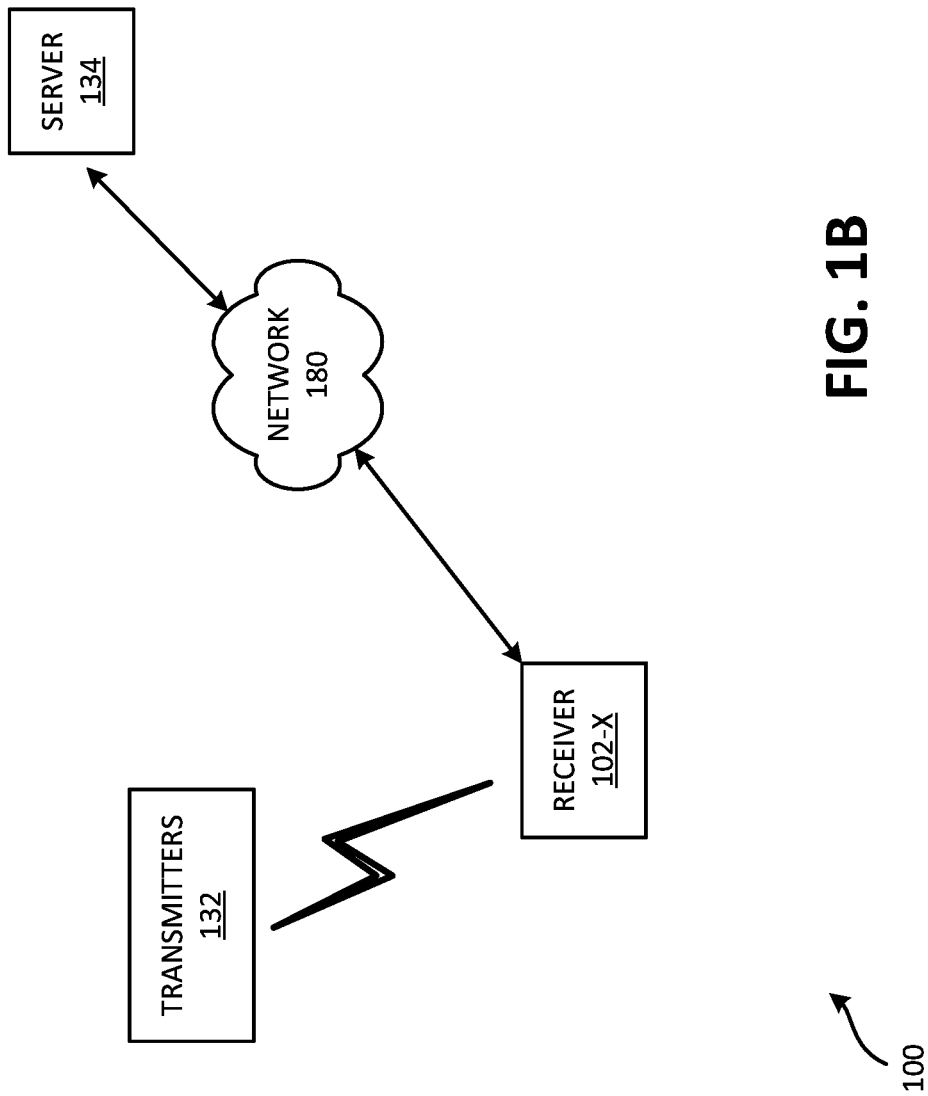
FIG. 1B is a diagram of an exemplary network including the receiver of FIG. 1A.

FIG. 1B is a block diagram of an exemplary environment 100 depicting additional devices other than receiver 102 shown in FIG. 1A. In addition to receiver 102, environment 100 may include transmitters 132, a server 134, and a network 180. Transmitters 132 may include satellites 106 (e.g., GNSS satellites), transmitters 108 (e.g., terrestrial broadcast antenna), and/or other transmitters. Transmitter 132 may be associated with a gain or attenuation (e.g., internal to transmitter 132 not associated with propagation of the transmitted signal). Receiver 102 may receive signals from transmitters 132 and record the power level of the received signals. Receiver 102 may also record the location of receiver 102 and information identifying the associated transmitter 132. Receiver 102 may also use received signals to estimate the location of receiver 102 (e.g., if receiver 102 includes a navigation device).

Server 134 may provide services to receiver 102 and/or process signals recorded by receiver 102 for estimating the parameters (e.g., characteristics) of objects in environment 100. For example, server 134 may include information (e.g., that may be downloaded by receiver 102) about the geometry surrounding receiver 102, such as two-dimensional and/or three-dimensional information about buildings or foliage surrounding receiver 102. In one embodiment server 134 may determine or contribute to the determination of location of receiver 102. As another example, in an implementation in which receiver 102 is a mobile phone, receiver 102 may download and run applications from server 134, such as applications from Apple's App Store, Amazon's Application store for Android or Kindle devices, Google's Play Store for Android devices, Verizon's Application store for Android devices, etc. Receiver 102 may also download maps, a mapping application, or a turn-by-turn navigation application from server 134.

Network 180 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 180 may allow devices (e.g., receiver 102) to connect to other devices (e.g., server 134) also coupled to network 180.

In one embodiment (e.g., in which receiver 102 is a mobile phone), network 180 may communicate wirelessly with receiver 102 using any number of protocols, such as GSM (Global System for Mobile Communications), CDMA (Code-Division Multiple Access), WCDMA (Wideband CDMA), GPRS (General Packet Radio Service), EDGE (Enhanced Data Rates for GSM Evolution), LTE (Long-Term Evolution), Universal Mobile Telecommunications System (UMTS), High-Speed Downlink Packet Access (HSDPA), etc. In one embodiment, receiver 102 may communicate with other devices using wireless network standards such as WiFi (e.g., IEEE 802.11x) or WiMAX (e.g., IEEE 802.16x).

Devices in environment 100 may be networked together such that, for example, any one device may receive signals and/or messages from any other device. Further devices in environment 100 may be networked together such that, for example, any one device may transmit signals and/or messages to any other device. In one implementation, receiver 102 may receive signals from transmitters 132 without necessarily transmitting signals to transmitters 132.

The exemplary configuration of devices in environment 100 of FIG. 1B is illustrated for simplicity. Environment 100 may include more devices, fewer devices, or a different configuration of devices than illustrated. For example, environment 100 may include thousands or millions of receivers and/or servers. In some embodiments, the functions performed by two or more devices may be performed by any one device. Likewise, in some embodiments, the functions performed by any one device may be performed by any other device or multiple devices.

Environment 100 shown in FIG. 1A may include more objects, fewer objects, or different objects than illustrated. For example, environment 100 may include objects other than buildings 104 that interfere with the propagation of signals (e.g., mountains, etc.). Environment 100 may include additional or fewer buildings 104, additional or fewer areas of foliage 105, additional or fewer transmitters 108, additional or fewer satellites 106, etc. In one embodiment, environment 100 may not include any transmitters 108, satellites 106, and/or buildings 104. Environment 100 may also include environmental conditions (e.g., atmospheric conditions) that may cause radio signal refraction or ducting.

FIG. 2A is a block diagram of exemplary receiver 102 in one embodiment. Receiver 102 may include GNSS logic 202, radio 204, a clock 206, and a memory 208. Receiver 102 may include additional, fewer, or a different arrangement of components than shown in FIG. 2A.

GNSS logic 202 includes logic that interprets signals received from satellites 106 to derive location information. GNSS logic 202 may include logic that interprets signals from GPS (Global Positioning System) satellites, GLONASS (Globalnaya Navigatsionnaya Sputnikovaya Sistema) satellites, Galileo satellites, BeiDou satellites, or any combination of these satellites or other navigation satellites. In one embodiment, GNSS logic 202 may output location information as NMEA (National Marine Electronics Association) sentences (e.g., NMEA 2000 sentences). NMEA is a standard protocol for relaying data that can include location information and/or information for deriving location, for example. In one embodiment, the NMEA sentences may include the estimated location and/or track of receiver 102. In another embodiment, the NMEA sentences may included the estimated location and/or track of receiver 102, signal-to-noise (SNR) information about the signal received from each satellite, and location/positional information (e.g. azimuth and elevation) for each satellite, along with other information.

Radio 204 may receive signals (e.g., from transmitters 134) and record the signals. In one embodiment, radio 204 records the power level (e.g., signal-to-noise ratio, SNR) of the received signal in memory 208. Radio 204 may have an associated gain (e.g., a sensitivity, attenuation, or loss) associated with it (e.g., measured in dB) not associated with the propagation of a received signal. For example, the power of a signal observed by radio 204 may differ from the power of the signal that impinges on the antenna of radio 204 because of an internal gain or attenuation of the receiver. Clock 206 may determine the time and may accurately associate a time of any received signal in memory 208.

Figure 2B:
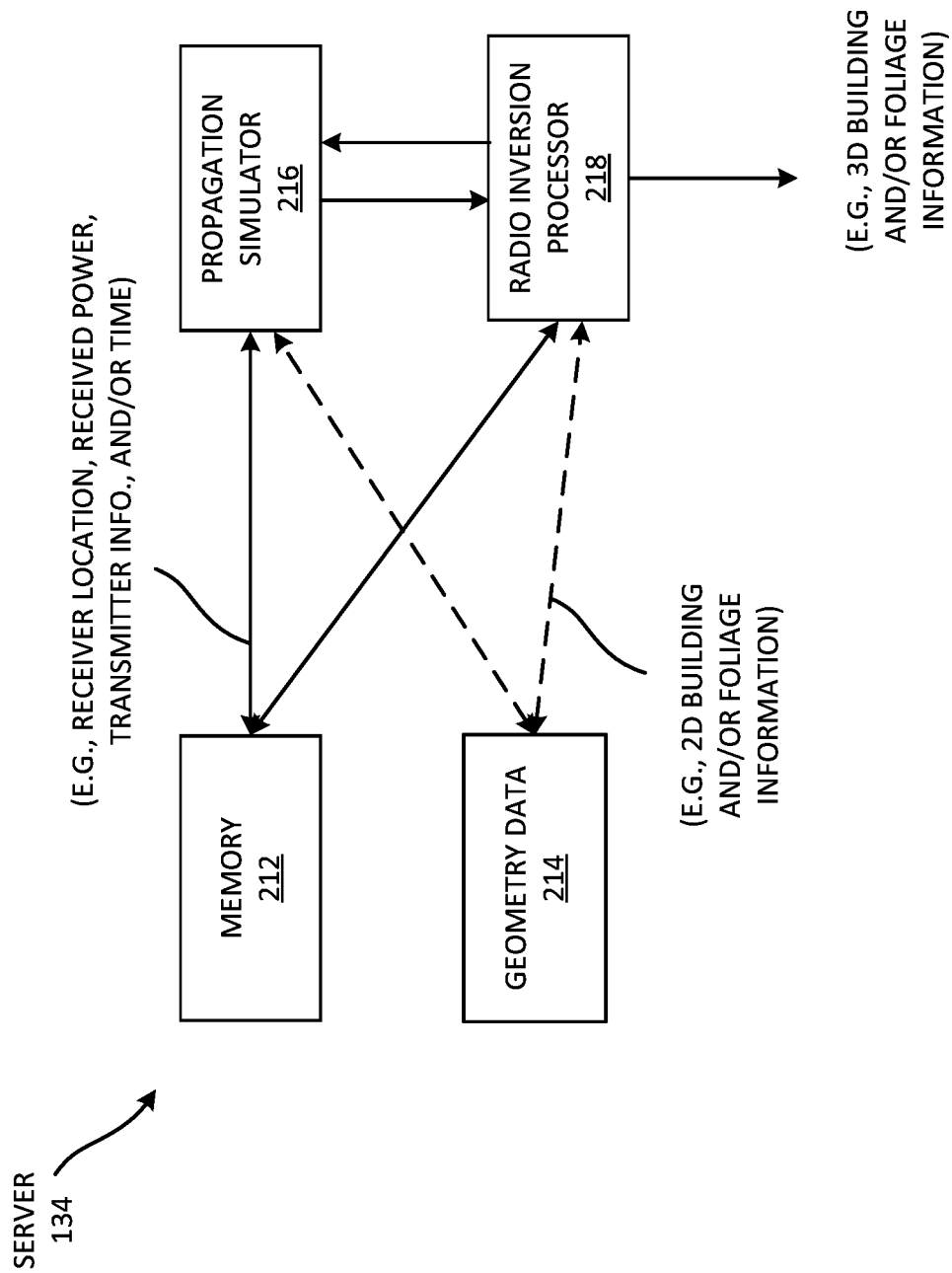
FIG. 2B is a block diagram of exemplary components of the server of FIG. 1B.

FIG. 2B is a block diagram of exemplary receiver server 134 in an embodiment. Server 134 may include memory 212, geometry data 214, and propagation simulator 216, and radio inversion processor 218. Server 134 may include additional, fewer, or a different arrangement of components than shown in FIG. 2B.

Memory 212 may store the information collected by one or more receivers 102 and stored in memory 208. In one embodiment, receiver 102 may upload the information from memory 208 to memory 212 during or after collection of the information.

Geometry data 214 may include 2D information (e.g., footprint information) or 3D information (e.g., 3D models) about buildings and the location of the buildings. For example, geometry data 214 may include the location of a building 104-*x* and the corresponding footprint of the building 104-*x*. Geometry data 214 may include the location of a building 104-*x* with a 3D model of buildings 104-*x*. Geometry data 214 may include information from Google Earth, for example. Geometry data 214 may be stored in the Keyhole Markup Language (KML) data format. In one embodiment, geometry data 214 also includes information about the characteristics of other obstructions (e.g., mountains, trees, etc.) that may effect the signals (e.g., obstruct the line of sight) transmitted from transmitter 132 to receiver 102.

Propagation simulator 216 may use an electromagnetic wave propagation model or simulation tool to generate expected signals given the 2D footprint of objects (e.g., nearby foliage or buildings) and/or 3D model of objects, considering effects of shadowing, diffraction, refraction, and/or reflection. In one embodiment, to reduce computation and model complexity, the propagation model may assume optical frequencies (e.g., that light does not diffract or includes little diffraction) when generating expected features. Alternatively, the propagation model may consider diffraction (e.g., given the frequencies of the signals of opportunity) when generating the expected features. In one embodiment, the propagation model may first determine expected features based on optical frequencies (e.g., without diffraction) and then adjust the determined expected features based on radio frequencies (e.g., with diffraction). In another embodiment, one propagation model may determine expected observations based on diffraction, another propagation model may determine expected observations based on reflections, and the results may be combined to approximate effects from both diffraction and reflection. In another embodiment, a diffraction model may be used, and background reflected power levels, which may be lower in power, may be more coarsely estimated and added. An example of a propagation simulator that can be used to calculate expected observations in the presence of buildings and foliage is the Wireless Insite propagation model provided by the company REMCOM™. Another example of a propagation simulator that can be used to calculate expected observations for ducting conditions is the Advanced Propagation Model (APM) developed by the by the Atmospheric Propagation Branch.

Radio inversion processor 218 may compare received signals to expected signals (e.g., "search the parameter space") to estimate, calculate, and/or determine the characteristics or parameters of objects in environment 100.

Figure 2C:
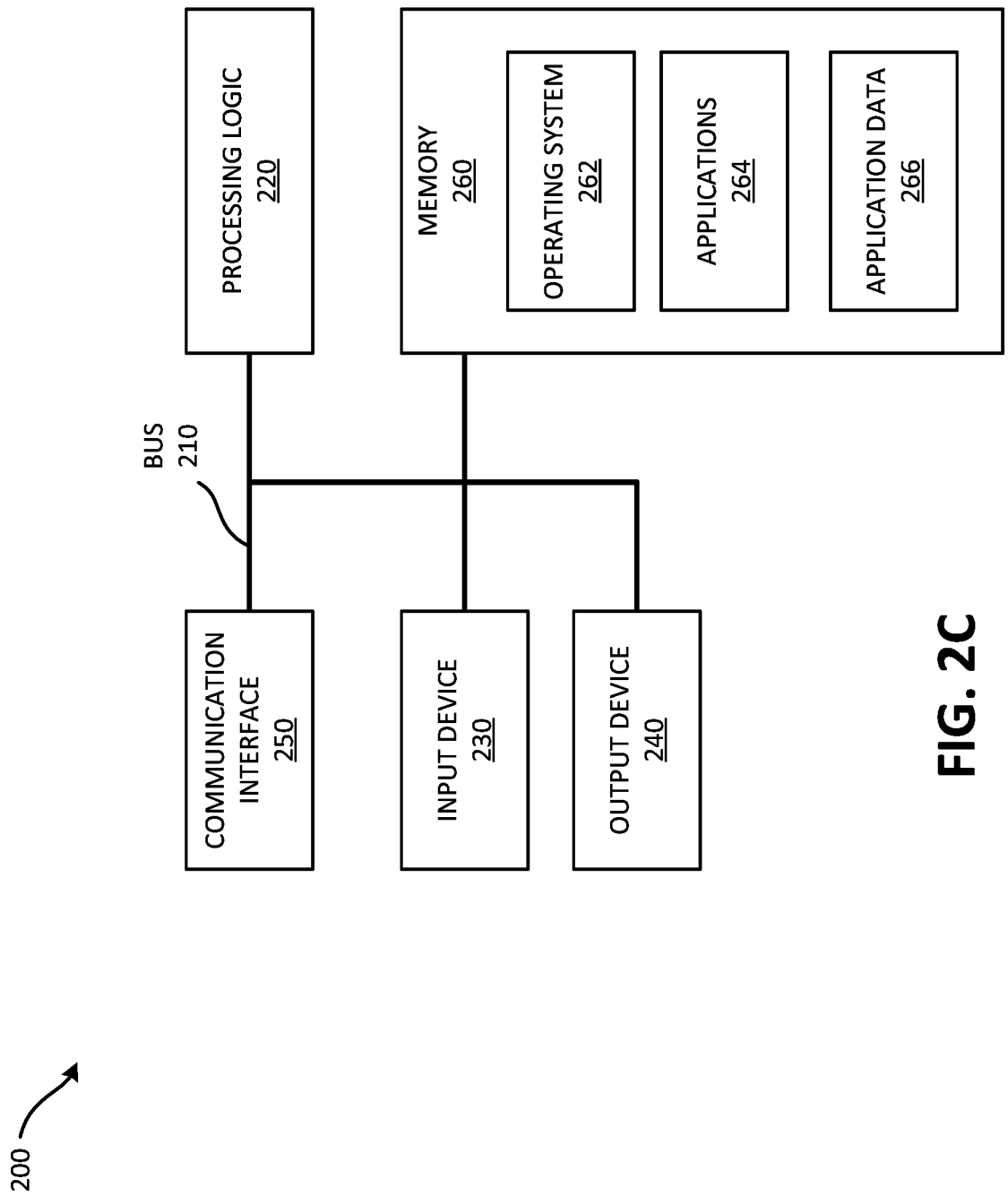
FIG. 2C is a block diagram of exemplary components of a computing module that may be included in the devices shown FIGS. 1A and 1B.

Devices in environment 100 of FIG. 1B, may each include one or more computing modules. FIG. 2C is a block diagram of exemplary components in a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 includes a path that permits communication among the components of computing module 200. Processing logic 220 may include any type of processor or microprocessor (or families of processors, microprocessors, or signal processors) that interprets and executes instructions. In other embodiments, processing logic 220 may include an application-specific integrated circuit (ASIC), a field-programmable gate array (FPGA), etc.

Communication interface 250 may include a transmitter and/or receiver (e.g., a transceiver) that enables computing module 200 to communicate with other devices or systems. Communication interface 250 may include a transmitter that converts baseband signals (e.g., non-modulated signals) to radio frequency (RF) signals or a receiver that converts RF signals to baseband signals. Communication interface 250 may be coupled to one or more antennas for transmitting and receiving electromagnetic (e.g., RF) signals. Communication interface 250 may include phase shifters or time delays for modulating received signals.

Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth wireless interface, a radio-frequency identification (RFID) interface, a near-field communications (NFC) wireless interface, etc. Communication interface 250 may be particularly adapted to receive signals from transmitters 108, satellites 106 (e.g., GNSS satellites), or other transmitters (e.g., cell towers, radio towers, etc.) Communication interface 250 may allow communication using standards, such as GSM, CDMA (e.g., CDMA 2000), WCDMA, GPRS, EDGE, LTE, UMTS, HSDPA, WiFi, or WiMAX.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include GNU/Linux, Windows, OS X, Android, iOS, an embedded operating system, etc. Applications 264 and application data 266 may provide network services or include applications, depending on the device in which the particular computing module 200 is found.

Input device 230 may allow a user to input information into computing module 200. Input device 230 may include a keyboard, a mouse, a microphone, a camera, a touch-screen display, etc. Some devices may not include input device 230. In other words, some devices (e.g., a "headless" device such as server 134) may be remotely managed through communication interface 250 and may not include a keyboard, for example.

Output device 240 may output information to the user. Output device 240 may include a display, a display panel, light-emitting diodes (LEDs) a printer, a speaker, etc. Headless devices, such as server 134, may be autonomous, may be managed remotely, and may not include output device 240 such as a display, for example.

Input device 230 and output device 240 may allow a user to activate and interact with a particular service or application. Input device 230 and output device 240 may allow a user to receive and view a menu of options and select from the menu options. The menu may allow the user to select various functions or services associated with applications executed by computing module 200.

Computing module 200 may include more or fewer components than shown in FIG. 2C. For example, computing module 200 may include a speedometer, a magnetometer, an accelerometer, a compass, a gyroscope, etc. The functions described as performed by any component may be performed by any other component or multiple components. Further, the functions performed by two or more components may be performed by a single component.

Computing module 200 may perform the operations described herein in response to processing logic 220 executing software instructions contained in a tangible, non-transient computer-readable medium, such as memory 260. A computer-readable medium include a physical or logical memory device. The software instructions may be read into memory 260 from another computer-readable medium or from another device via communication interface 250. The software instructions contained in memory 260 may cause processing logic 220 to perform processes that are described herein.

Figure 3:
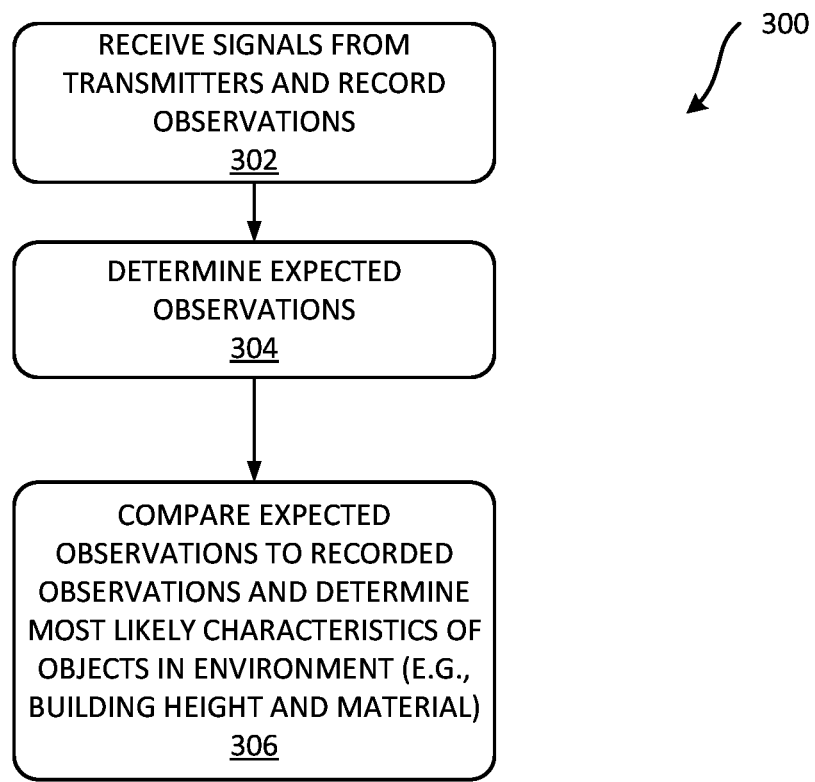
FIG. 3 is a flowchart of an exemplary process for determining the characteristics of objects in the environment of FIG. 1A.

As described above, methods and systems described herein may determine characteristics of objects in environment 100. FIG. 3 is a flowchart of an exemplary process 300 for determining the characteristics of objects in one embodiment. Signals may be received and observations recorded (block 302). In one embodiment, the location of receiver 102 (e.g., as determined by GNSS logic 202 or some other method), the time (e.g., as determined by clock 206 or another means), and the identity of transmitter 132 may also be recorded. For example, a vehicle may carry receiver 102 through environment 100 while radio 204 receives signals that are transmitted from one or more transmitters 132 (e.g., a TV broadcast tower, a cell tower, a satellite, etc.) Recording the observations (e.g., signals) may include recording the power level or other features (e.g., SNR, frequency, polarization, etc.) of the received signal, an indication of transmitter 132 that transmitted the signal, and the time into memory 208. In addition, the location (e.g., determined by GNSS logic 202 or some other method) of receiver 102 may be recorded in memory 208 and associated with the observation. In one embodiment, the time the signals (e.g., determined by clock 206 or other means) are received and observed may also be recorded in memory 208 and associated with the corresponding power levels. Recorded observations may also be referred to as measurements or measured observations.

Receiver 102 may receive signals and record observations periodically (e.g., based on time such as every fraction of a second, every second, every few seconds, every minute, every few minutes, etc.) or aperiodically (e.g., not evenly spaced in time). Receiver 102 may receive signals and record observations at particular distance intervals (e.g., every few feet, every meter, every kilometer, etc.) or aperiodic distance intervals (e.g., distances not evenly spaced). Receiver 102 may receive signals and record observations when in a particular location. In another embodiment, multiple different receivers 102 may receive signals and record observations. In this embodiment, receivers 102 may be in different locations and the corresponding locations may then be recorded in memory 208 and associated with the recorded observations.

Expected observations may be determined (block 304). In one embodiment, for each signal that is received and observation(s) recorded, one or more expected observations may be determined. In another embodiment, one or more expected observations may be determined for fewer than all the recorded signals. Expected observations may be determined based on (1) the location of the receiver 102 when the signal was received and observation(s) recorded; (2) the location of transmitter 132 that transmitted the corresponding received signal; and/or (3) possible combinations of characteristics that describe objects (e.g., buildings, foliage regions, and/or atmosphere) that may affect the signal as it propagates from transmitter 132 to receiver 102. Expected observations may include the expected received power (e.g., SNR), the expected frequency, the expected polarization, the expected echo profile, etc.

The recorded observations may be compared to the expected observations and the most likely characteristics of the objects in environment 100 may be determined (block 306). For example, the recorded power level of the received signals may be compared to the expected power level of the received signals. Based on the comparison, the most likely characteristics of objects in environment 100 (e.g., building height and material, foliage height and type) may be determined.

Figure 4:
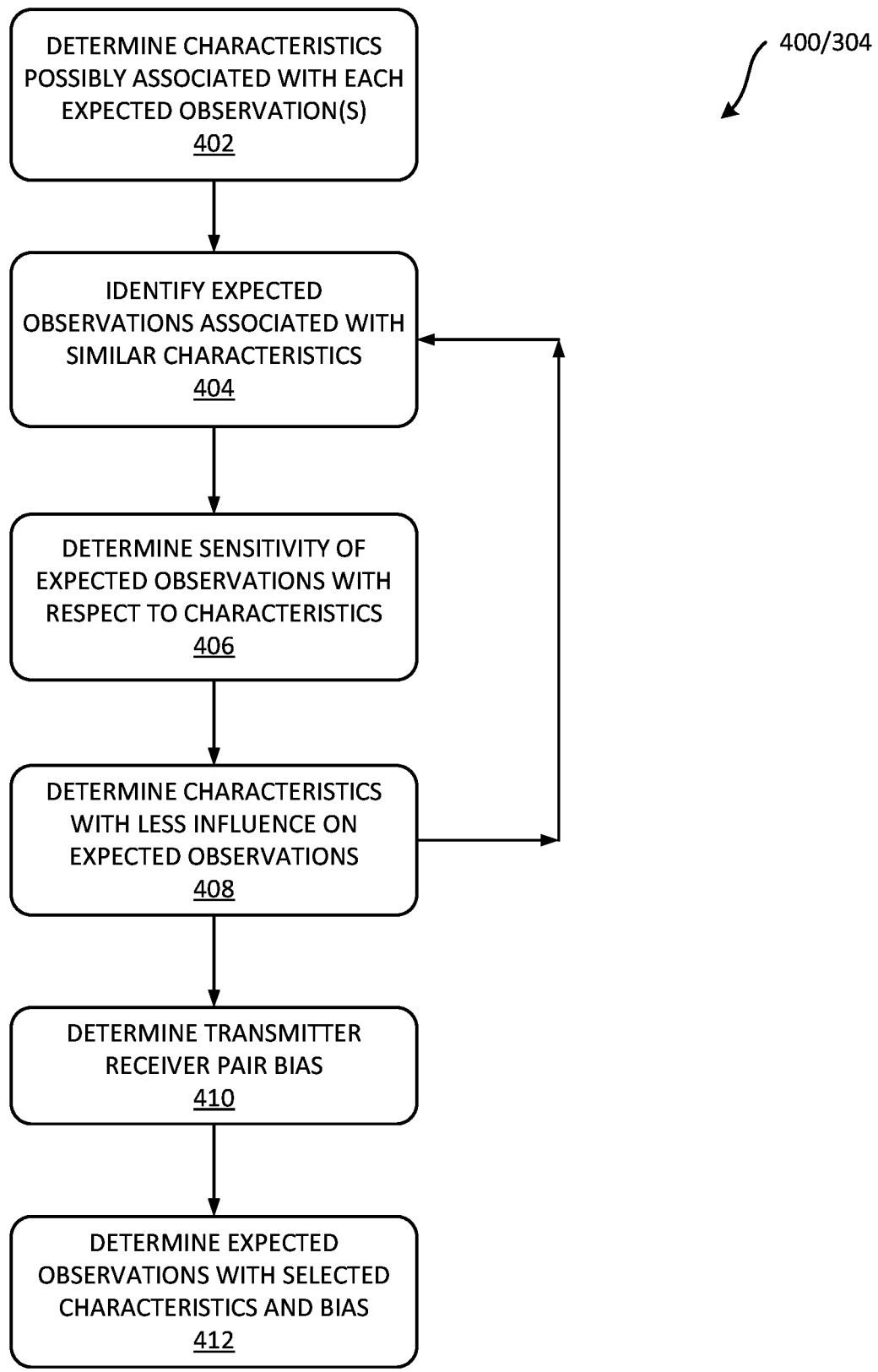
FIG. 4 is a flowchart of an exemplary process for determining expected observations.

FIG. 4 is a flowchart of an exemplary process 400 for determining expected observations (e.g., block 304 in FIG. 3). In one embodiment, propagation simulator 216 determines the expected observations. An expected observation may depend on the following information, for example: the location of receiver 102, the location of corresponding transmitter 132, the frequency of the radio signal, the gains and losses of the transmitter 132 and/or receiver 102, and/or the characteristics (e.g., parameters) of the objects in environment 100. The characteristics of objects in environment 100, however, may not be known (or may be only partially known). In one embodiment, therefore, simulator 216 may generate more than one (e.g., many) possible expected observations for each measured and recorded observation. Each possible expected observation may be influenced by a different set of characteristics of the objects in environment 100, for example. For a given expected observation to determine, the environmental characteristics (e.g., parameters) that are possibly associated with expected observations may be determined (block 402). In this embodiment, removing characteristics of objects in environment 100 that are not associated with an expected observation may reduce the computation power and time for determining the characteristics.

Figure 5:
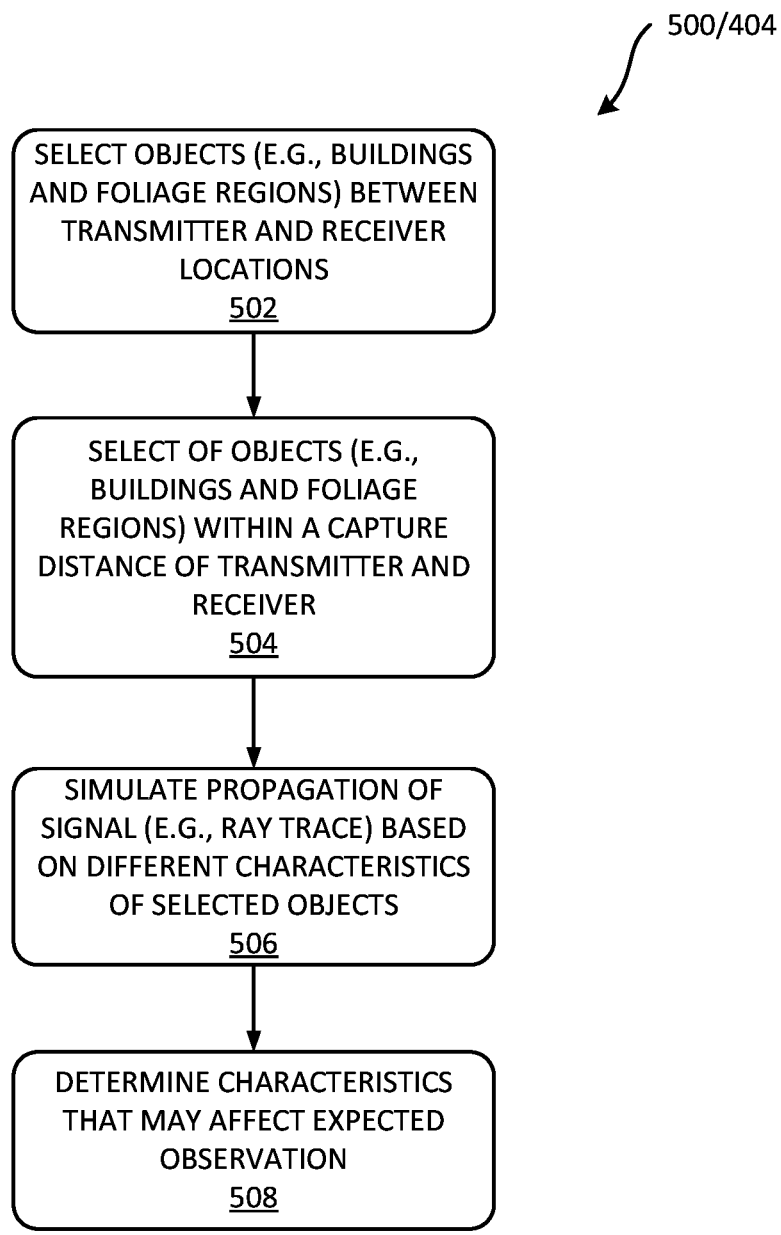
FIG. 5 is a flowchart of an exemplary process for identifying characteristics associated with similar expected observations.

FIG. 5 is a flowchart of an exemplary process 500 for determining the possible environmental characteristics associated with expected observation(s) (e.g., block 404 in FIG. 4) in one embodiment. Process 500 begins with a selection (e.g., determination) of the objects (e.g., buildings and/or foliage regions) between (e.g., directly between) the particular transmitter 132 and receiver 102 (block 502). In one embodiment, the objects (e.g., the characteristics of the objects) directly between the transmitter and receiver may be considered to have a possible influence on the expected observation between the two. In another embodiment, selected objects may be removed from consideration (e.g., deselected) if a propagation simulation indicates that the object does not have a significant influence on the expected observation.

Process 500 may continue with a selection (e.g., determination) of objects within a certain capture distance of the corresponding transmitter 132 and receiver 102 (block 504). The capture distance may depend on the environment, but may range from a few meters (e.g., 10 m), a kilometer, a few kilometers (e.g., 10 km), etc. The capture distance for transmitter 132 and receiver 102 may be different from each other. Further, because the capture distance may depend on the environment, the capture distance may change with location (e.g., as the receiver moves).

The propagation of the signal from transmitter 132 to receiver 102 may be simulated (block 506) based on varying characteristics of the selected objects (e.g. the different parameters of the selected objects). In one embodiment, a 2D or 3D ray trace algorithm may be used to determine which objects cause reflections for a given expected observation. In another version of that embodiment, height parameters or transmission attenuation parameters may be varied for the selected objects to consider varying propagation paths through the objects for an expected observation. In another embodiment, one or more objects may be considered 'transparent' and allow the signal to pass through or over them after each reflection in the simulation of the expected observation for selecting varying sets of object characteristics in the simulation. Possible characteristics of expected observations that result from signal interactions with objects (reflections from, transmission through, transmissions over) may be identified as the object characteristics are varied.

As a result of selecting objects (blocks 502 and 504) and simulating propagation of signals (block 506), a list of possible characteristics (e.g., associated with each expected observation) may be determined (block 508). For example, when a simulated reflection from an object occurs (e.g., block 506), a material type characteristic (parameter) for that object may be associated with the expected observation. As another example, when a simulated reflection from an object occurs (e.g., block 506), a height characteristic (parameter) for that object may be associated with the expected observation. As yet another example, when a signal is simulated to pass through or over an object (e.g., block 506), a height characteristic or attenuation characteristic (parameter) for that object may be associated with the expected observation. As yet another example, when an object is determined to exist between transmitter 132 and receiver 102 (e.g., the object blocks the path of propagation for the expected observation in block 502), a height characteristic (parameter) for that object may be associated with the expected observation. In one embodiment, the expected observation and the associated characteristics may be arranged and stored in a matrix, with the expected observation in a column and the characteristics in a row. If the characteristic has a possible influence on the expected observation, then the intersecting cell may be so marked (e.g., with a '1'). If the characteristic has not been found to have a significant enough influence on the expected observation, then the intersecting cell may also be so marked (e.g., with a '0'). In this embodiment, removing characteristics of objects in environment 100 that are not associated with an expected observation may reduce the computation power and time for determining the characteristics.

Returning to FIG. 4, object characteristics that are associated with similar or the same set of expected observations are identified (block 404) and grouped or clustered. In one embodiment, object characteristics may be grouped based on the Euclidean distance between the rows in the matrix described above. Low distances indicate a higher level of similarity and identify object characteristics that may be grouped into the same cluster. In one embodiment, a cluster may be limited to a specific number of object characteristics. For example, a cluster may be limited to five or six objects. Grouping of object characteristics may continue until all object characteristics are included in a cluster.

Figure 6:
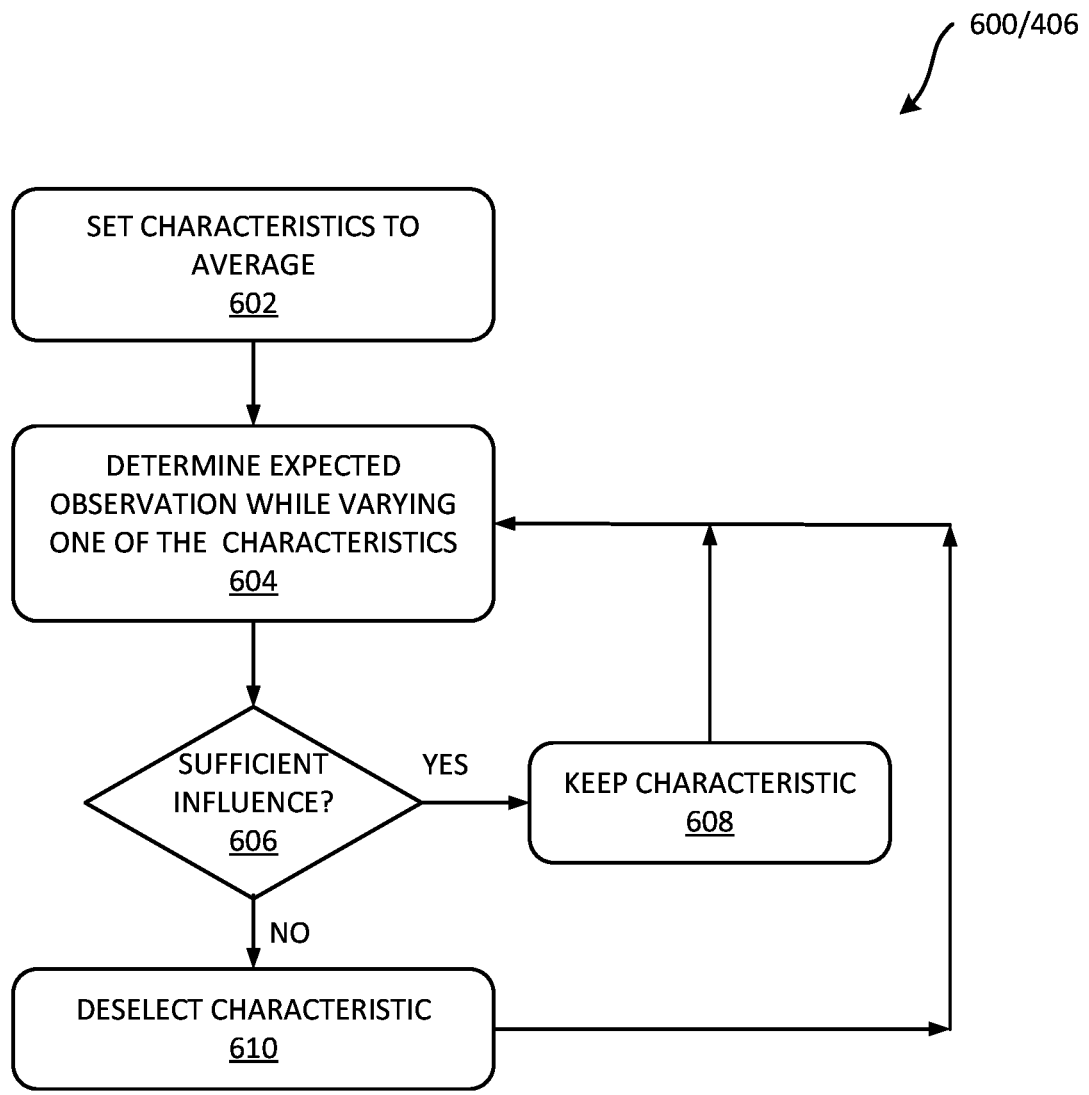
FIG. 6 is a flowchart of an exemplary process for determining the sensitivity of expected observations with respect to characteristics.

The sensitivity of expected observation(s) to characteristic(s) may be determined (block 406). FIG. 6 is a flowchart of an exemplary process for determining the sensitivity of expected observations to characteristics (e.g., block 406 in FIG. 6). Process 600 may begin with the setting of the characteristics for a given expected observation (e.g, as defined in the matrix) to an average value (block 602). The average value may be stored in a library and may change according to general location or class (e.g., type) of general characteristics of the area (e.g., urban versus rural, New York versus Washington, DC, etc.). The expected observation may be calculated while varying one of the characteristics (block 604). The expected observation may be generated by propagation simulator 216, for example.

If the expected observation changes sufficiently (e.g., more than a threshold) (block 606: YES), then the characteristic may be considered appropriate to keep in the matrix (block 608). Characteristics that have less influence on an expected observation (e.g., the change is less than a threshold) (block 606: NO) may be removed (block 610) as part of the process for determining characteristics with less influence on expected observations (block 408). Further, any expected observation that is no longer associated with any characteristics of the cluster may be removed from the cluster. In this embodiment, process 400 may return to block 404 and expected observations may be regrouped based on similar characteristics. Again, in this embodiment, removing characteristics of objects in environment 100 that do not sufficiently influence expected observations may reduce the computation power and time for determining the characteristics. In another embodiment, characteristics of objects that have less influence on an expected observation (block 606: NO) may be left in the cluster (e.g., so that no cluster modifications are made) but disregarded in future calculations. In another embodiment, these characteristics may not be estimated by radio inversion processor 218. Rather, a default or average value may be used for the characteristics when performing calculations in propagation simulator 216 to estimate other object characteristics.

Figure 7:
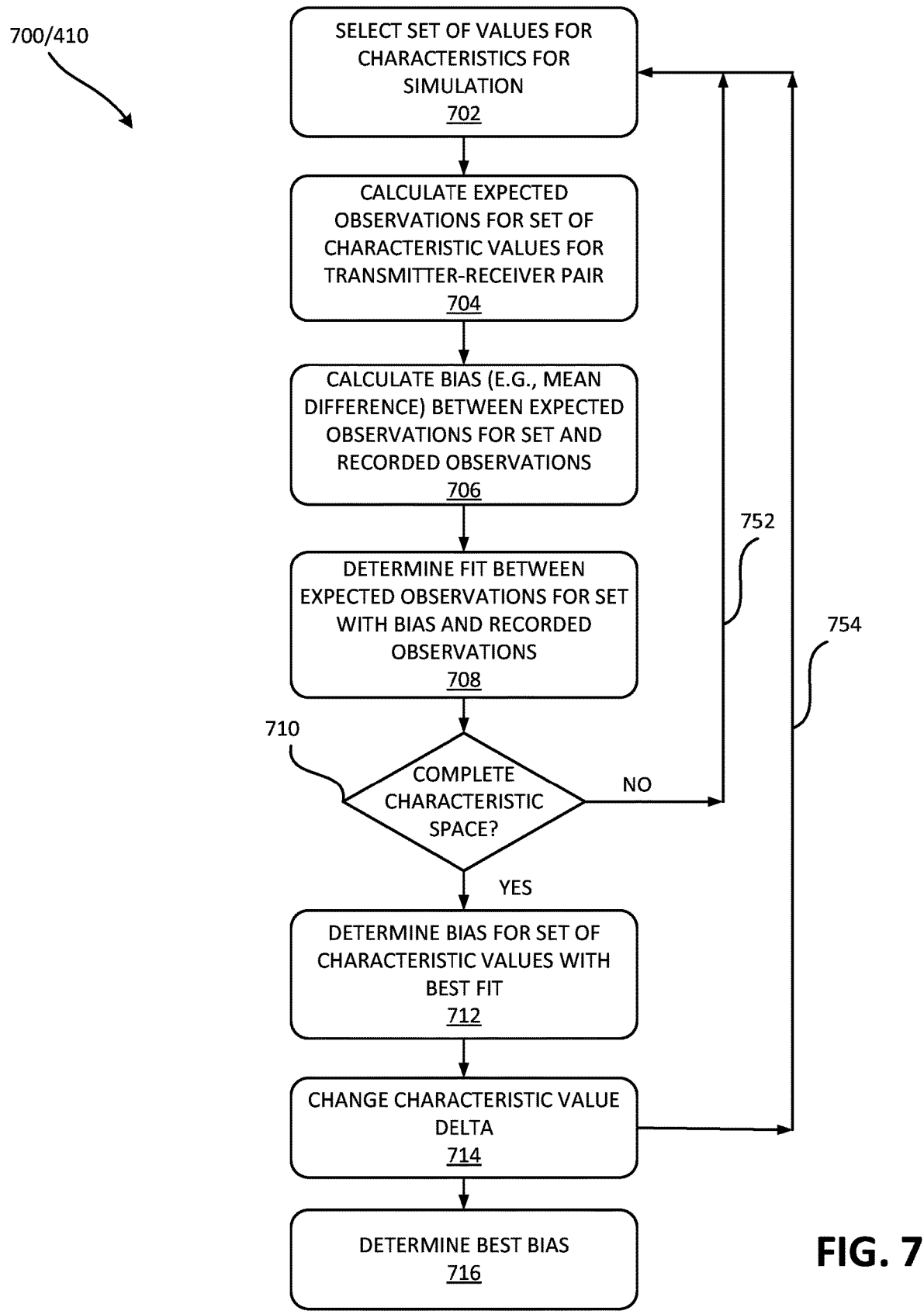
FIG. 7 is a flowchart of an exemplary process for determining expected observations with selected characteristics and bias.

Biases for a transmitter-receiver pairs may be determined or calculated (block 410). The bias may include the gain and/or attenuation of a transmitter-receiver pair (e.g., the attenuation and/or gain internal to transmitter 132 and receiver 102 not associated with propagation of the signal between the two). FIG. 7 is a flowchart of an exemplary process 700 (e.g., block 410) for determining the bias of a transmitter-receiver pair. Process 700 may begin with the selection of values for characteristics for simulation (block 702). For a given set of values, expected observations may be calculated (block 704). For example, propagation simulator 216 may simulate the propagation of a signal for every recorded observation for every transmitter-receiver pair with the set of values (e.g., for a given cluster or group). The bias for the given set of values of characteristics may be determined or calculated (block 706). The bias may be calculated by determining the mean difference between the expected observations and the recorded observations for the transmitter-receiver pair for the set of values. It is not known whether the selected set of values are the correct values for the characteristics, however. Thus, a fit may be calculated or determined between the expected observations for the set of values, assuming the determined bias, and the recorded observations (block 708). The fit metric provides an indication of whether the bias calculated for the set is an actual estimation, for example. The bias and corresponding fit metric may be recorded and stored. The bias from the set of characteristics with the best fit can be stored (e.g., in memory 212), or the biases from the best N set of fit metrics from N sets of characteristics can be combined and stored. The characteristics can be combined in several ways, including averaging, taking the median bias for several different sets of characteristics, or in other ways.

The determination of fit (e.g., the "fit metric") (block 708) may be calculated to determine how well one set of expected observations match the recorded observations (e.g., the measurements) for one set of characteristics. The calculated bias may be applied to the expected observations (e.g., added or subtracted) so that the power level of the expected observations matches those of the measurements (e.g., the average of the expected observations matches the expected. In another embodiment, the calculated bias may be applied (e.g. added or subtracted) to the measurements. Then a calculation may be used to determine how well the expected observations match the recorded measurements across the particular set of characteristics (e.g., a given combination of building height and materials and/or foliage height and materials). In one embodiment, the calculation may include a root mean squared error or the mean squared error between the expected observations (e.g., offset by the bias) and the measurements. In another embodiment, the calculation may include the mean absolute error between the expected observations (e.g., offset by the bias) and the measurements. In another embodiment, the calculation may include the median of the difference between the expected observations (e.g., offset by the bias) and measurements. In yet another embodiment, the calculation may include the maximum or minimum of the difference between the expected observations (e.g., offset by the bias) and measurements. In still another embodiment, the calculation may include several of these metrics combined together or used in a coordinated manner to define a fit metric.

If the sets of values for characteristics (e.g., "characteristic space") have not been searched to the desired extent (block 710: NO), then a new set of values for characteristics may be selected for simulation (block 702). When selecting values for characteristics, the values may be offset by a delta value in a positive and/or negative direction (e.g. by adding height and/or subtracting height to a building height characteristic, or by considering a more reflective and/or less reflective material surface). The delta value may be different for different types of characteristics. Further the delta value may be different depending on the number of times the characteristic space has been searched. The process may be repeated (e.g., loop 752) until the characteristic space has been searched simulated (block 710: NO).

The bias for the set of characteristic values with the best fit may be determined (block 712). In this case, the set of values with the best fit may be considered the closest to the actual characteristics of objects in the environment. Therefore, the bias of the associated with the set of characteristic values with the best fit may be considered the closest to the actual bias—at least with respect to the collection of sets of values from the first pass of loop 752.

Loop 752 has the effect of "searching" through "characteristic space," e.g., searching through the different possibilities of characteristics of objects in environment 100. In other words, given the selection of characteristics of objects, expected signals can be simulated by propagation simulator 216 across the possible values of those characteristics (each set of characteristics being simulated at a time). For example, suppose that two characteristics are selected for environment 100 for one expected signal: the height of building 104-1 and the building material for building 104-1. An expected observation may be calculated for the possible building heights in combination with the possible building materials: e.g., an expected observation for a one-story building of concrete; an expected observation for a two-story building of concrete; an expected observation for a three-story building of concrete; an expected observation for a four-story building of concrete; an expected observation for a one-story building of glass and steel; an expected observation for a two-story building of glass and steel; etc. These different expected observations would correspond to one of the recorded observations (e.g., measured observations). The expected observations may be determined that correspond to each recorded observation across the characteristic space.

In one embodiment, the first set of values for characteristics may include or be based on average values (e.g., stored in a library) of objects in a class of environment (e.g., urban, suburban, rural, a particular city or region, etc). In one embodiment, the first pass through characteristic space (loop loop 752) may be based on a selection of a large delta value in any one direction or both directions from the initial value (e.g. positive building height offset and negative building height offset, or positive change in building material reflectivity and negative change in building material reflectivity). The determination of fit (block 708) may be calculated for both directions (both sets of characteristics) and the better fit may be considered more accurate and may be retained. In one embodiment, the set of characteristics may be considered less accurate and not used for further calculations. In one embodiment, to refine the determination of the bias, smaller delta value(s) may be selected and used (block 714) to repeat a search through the relevant characteristic space. In this embodiment, the characteristic space may be reduced to the space around the characteristic values that resulted from the best fit (e.g., block 712). After each search through characteristic space (loop 752), smaller and smaller delta values may be used (loop 754) to continually refine the calculation of the bias. In one embodiment, for example, loop 754 may be repeated four times. In one embodiment, loop 754 may be repeated until the values converge onto a solution. As a result, the best bias may be determined (block 716). Process 700 may be repeated for each cluster of characteristics.

In another embodiment, the delta value for each direction (e.g., positive and negative) may be of different magnitude. In yet another embodiment, a delta value may be considered in only one direction and the resulting fit metric compared to a baseline fit metric (e.g., no variation in characteristics from the initial value). Other search methods can also be used.

In one embodiment, before the fit is determined or calculated (block 708), filters may be applied to the recorded observations, to the expected observations, or to both. The filtering process may be used to reduce the effect of errors in the measurements or expected observations. The filtering process may be used to reduce the effect of errors (e.g., noise) in space and/or time (e.g., physical scales or temporal scales) that are not accurately represented in the measurements or expected observations. For example, if there is a very short term variation (e.g., noise that is not part of the bias) in the receiver gain, this variation can be filtered so that the resulting difference between the expected and measured observations better represent the bias and provides for a better bias calculation. For this optional step, coefficients can be applied that produce a filtering effect either in the time or distance dimension along a set of measurements or expected observations. The filtered measurements and/or expected observations can then be used to calculate the fit metric (block 708).

The bias for a receiver-transmitter pair may change with time. For example, a user may hold the phone in a way that changes the resonant frequencies of the antenna, which may change the gain of the antenna of the receiver. As another example, the user may put the phone on a table or in a pocket, which may also change the characteristics of the antenna and the corresponding gain of the antenna. In one embodiment, the bias calculation conducted in process 700 may be conducted for a given transmitter-receiver pair for one or more different time frames. In one embodiment, the bias may be assumed to be valid for short intervals (e.g. a minute) or long intervals (e.g. an hour). In one embodiment, measurements are added to the process 700 that may have been captured over a restricted time interval. Multiple estimates of link biases for that transmitter-receiver pair may be estimated for each time interval. These link biases may be combined via a temporal filter (e.g., a finite-impulse response (FIR) filter, or an infinite-impulse response (IIR) filter) to provide a slower time-varying estimate of link bias. The specific characteristics of the filter may be changed to provide either a slower varying or more rapidly varying estimate of link bias, depending on the nature of the receiver and link being used. The time interval over which data is captured for each link bias estimate may be changed to support a slow time-varying estimate of link bias, or a more rapidly time-varying estimate of link bias.

In one embodiment, the time frame associated with the recorded observations and/or the expected observations may be based on or determined by activities of the device the includes receiver 102. For example, if receiver 102 is in a mobile phone, a proximity sensor may determine when the phone is pressed against the body of the user; an accelerometer may determine when the phone is being carried; an orientation sensor may determine the orientation of the phone. The operating system may determine whether the user is on a call, using a particular application, touching the screen, touching the volume rocker, etc. In this case, when the mobile phone transitions from one activity to another that may affect the gain of receiver 102 (e.g., the resonant frequency of an antenna), then a new time frame may be initiated. Further, activities of the mobile phone may be used to determine the characteristics of the filter. That is, activities that introduce rapid and short fluctuations in the gain of receiver 102 (e.g., holding, walking, etc.) may result in a stronger filter response. Activities that do not introduce rapid and short fluctuations in the gain of receiver 102 (e.g., not in motion on a table) then the filter response may not be as strong. In one embodiment, the activities of the mobile phone may inform the initial values of the characteristic space (e.g., the initial pass of loop 752), the delta value or the change in the delta value (e.g., block 714).

In one embodiment, process 700 may be repeated for each cluster (e.g., decided in block 404). After each cluster completes a certain number of passes (e.g. four), or the fit metric achieves a certain goal in error, process 700 may conclude. The parameters associated with the multiple passes (loop 754) (e.g., the delta value for each type of characteristic for each pass, the bounds for each type of characteristic, the initial value for each type of characteristic in the first pass) can be stored and associated with a 'class' in a library. That is, these parameters can be associated with specific types of environments that may vary from one another in general characteristics (e.g., rural, suburban, urban, major metropolitan, and/or specific areas such as a particular city). For environment 100, process 700 may be run for multiple classes (e.g., urban, suburban, etc.) even though the type of environment is known (e.g., an urban environment). For example, even though receiver 102 is known to have recorded measurements in an urban environment, process 700 may assume a suburban environment in one iteration and then assume an urban environment in another iteration. The results (e.g., bias and/or fit metrics) may be stored for each class. These results can be retained to be compared at the end to determine the best class. Thus, if receiver 102 is known to be in an urban environment, but the best class turns out to be a suburban class, then the results may be considered to be suspect. In one embodiment, with each pass through loop 754, the delta value may decrease. In this embodiment, the delta value may decrease exponentially toward zero (e.g., the previous delta value may be multiplied by a value less than one raised to the power of the number of passes through loop 754).

Figure 8:
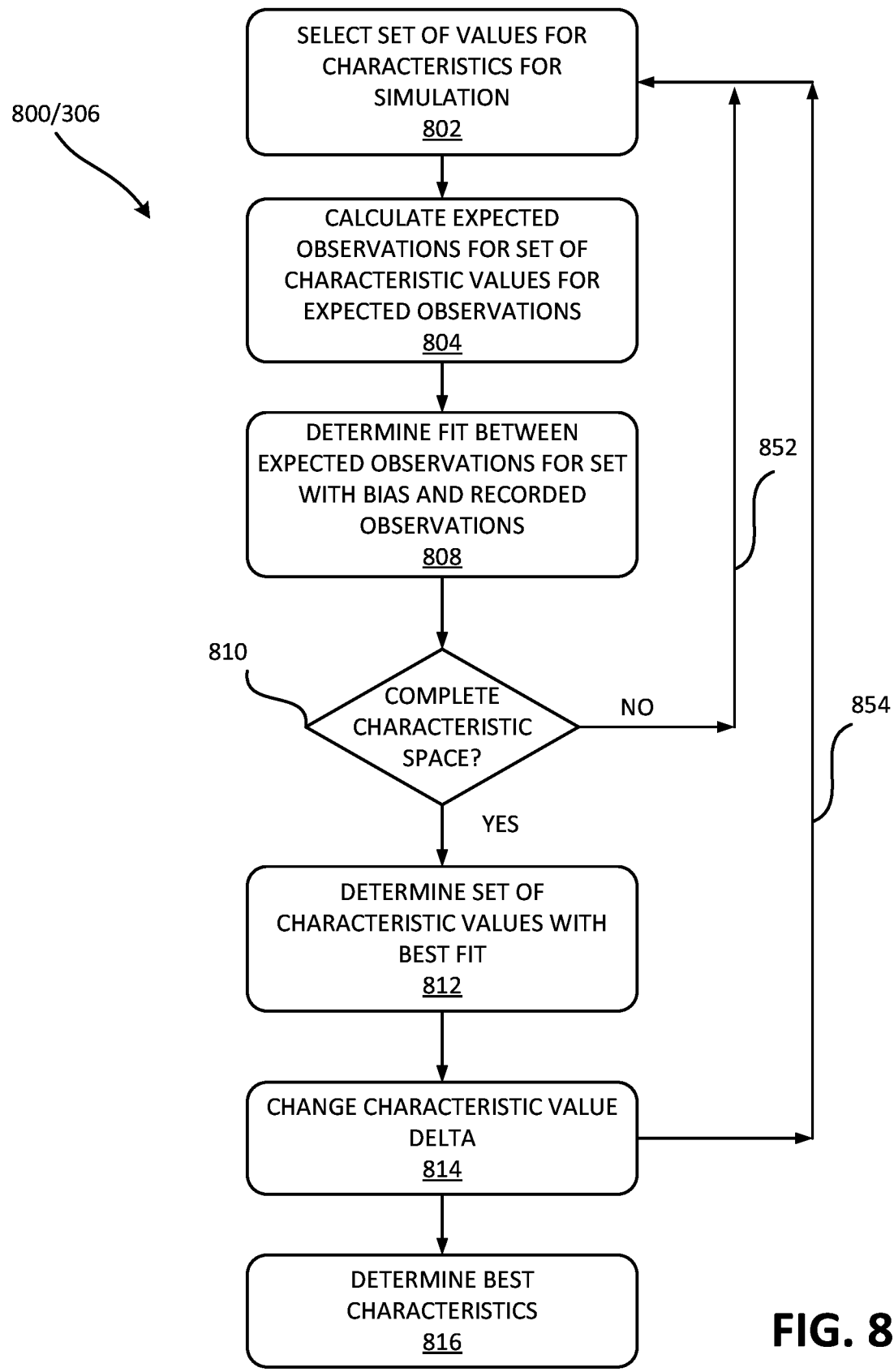
FIG. 8 is a flowchart of an exemplary process for determining the most likely characteristics of objects in an environment.

Returning to FIG. 4, the expected observations may be determined across the selected characteristics given the determined bias (block 412) (e.g., completing block 304). Returning to FIG. 3, the expected observations may be compared to recorded measurements to determine the most likely characteristics of the objects in environment (block 306). FIG. 8 is a flowchart of an exemplary process 800 (e.g., block 306) for determining the characteristics of objects in environment 100. Process 800 may begin with the selection of values for characteristics for simulation (block 802). For a given set of values, expected observations may be calculated (block 804). For example, propagation simulator 216 may simulate the propagation of a signal for every recorded observation for every recorded observation with the set of values (e.g., for a given cluster or group). The bias that was calculated in process 700 may be used to offset the expected signal, for example. It is not known whether the selected set of values are the correct values for the characteristics, however. Thus, a fit may be calculated or determined between the expected observations for the set of values and the recorded observations (block 808). The fit metric provides an indication of whether the bias calculated for the set is an actual estimation, for example. The fit metric may be recorded and stored along with the set of values of characteristics.

If all of the characteristic space has not been searched (block 810: NO), then a new set of values for characteristics may be selected for simulation (block 802). When selecting values for characteristics, the values may be offset by a delta value from the previous simulation (block 804). The delta value may be different for different types of characteristics. Further the delta value may be different depending on the number of times the characteristic space has been searched. The process may be repeated (e.g. loop 852) until the characteristic space has been searched simulated (block 810: NO).

The set of characteristic values with the best fit may be determined (block 812). In this case, the set of values with the best fit may be considered the closest to the actual characteristics of objects in the environment. Therefore, the bias of the associated with the set of characteristic values with the best fit may be considered the closest to the actual bias—at least with respect to the collection of sets of values from the first pass of loop 852.

In one embodiment, the first pass through characteristic space (loop loop 852) may be based on a large selection of a delta value. In one embodiment, to refine the determination of the bias, a smaller delta value(s) may be used to repeat a search through the characteristic space (block 814). In this embodiment, the characteristic space may be reduced to the space around the characteristic values that resulted from the best fit (e.g., block 812). After each search through characteristic space (loop 852), smaller and smaller delta values may be used (loop 854) to continually refine the calculation of the bias. In one embodiment, for example, loop 854 may be repeated four times. In one embodiment, loop 854 may be repeated until the values converge onto a solution. As a result, the best values for the characteristics be determined (block 816).

Process 800 may be repeated for each cluster of characteristics.

In one embodiment, before the fit is determined or calculated (block 808), filters may be applied to the recorded observations, to the expected observations, or to both. The filtering process may be used to reduce the effect of errors in the measurements or expected observations. The filtering process may be used to reduce the effect of errors (e.g., noise) either in space and/or time (e.g., physical scales or temporal scales) that are not accurately represented in the measurements or expected observations. For example, if there is a very short term variation (e.g., noise that is not part of the bias) in the receiver gain, this variation can be filtered so that the resulting difference between the expected and measured observations better represent the bias and provides for a better bias calculation. For this optional step, coefficients can be applied that produce a filtering effect in the time and/or distance dimension along a set of measurements or expected observations. The filtered measurements and/or expected observations can then be used to calculate the fit metric (block 708)

Process 700 (to estimate link biases) and process 800 (to estimate best characteristics) can be repeated in stages. In one embodiment, all characteristics of objects in an environment (e.g., environment 100) may be considered together in one cluster (e.g., a single cluster), process 700 may calculate link biases, and the characteristics (e.g., all characteristics) for the environment may be combined in the process 800.

In another embodiment, as described in process 400 and block 402, characteristics of objects in environment 100 may be grouped together into smaller clusters so that multiple clusters of characteristics form the entirety of environment 100. In this case, process of 700 and process 800 can be executed separately for each cluster. This can be done considering only the objects in the cluster (e.g., ignoring objects outside the cluster) for calculations in the propagation simulator 216 and the radio inversion processor 218. Alternatively, it can be done by varying the characteristics (searching the characteristic space) for only the objects in the cluster, but considering some other estimate of characteristics (e.g., results from previous estimates) for characteristics in other clusters while completing the computations associated with the propagation simulator 216.

In one embodiment, the multiple passes of process 700 and process 800 may be executed one time (e.g., process 700 and process 800 may be executed one time). In another embodiment, the process 700 and process 800 can be repeated in their entirety multiple times, in multiple 'stages,' while generating results (e.g., best fit bias and best characteristics) with each stage. In one embodiment, these multiple stages (multiple executions of process 700 and process 800) can use the same set of transmitters 132 (e.g., satellites 106 and transmitters 108). In another embodiment, the selection of transmitters 132 and measurements can change or differ from one stage to the next stage. In one embodiment, the fidelity of propagation simulator 216 can be constant throughout the multiple stages and across each transmitter. In another embodiment, the fidelity of propagation simulator 216 can vary by transmitter or from one stage to the next stage. In one embodiment, the estimated position of the receivers for each measurement and expected observation can be the same for all stages. In another embodiment, improved estimates of position for receivers for each measurement and expected observation can be used in subsequent stages. For example, the method and apparatus described in the U.S. patent application Ser. No. 13/865,826, titled "Navigation Track Correction," filed Apr. 18, 2023, which is incorporated herein by reference in its entirety, may be used to improve the location estimate from one stage to the next stage. Other methods to improve the accuracy of receiver positions from one stage to the next can also be used.

When characteristics of objects in environment 100 are grouped into clusters using process 400 (block 402), the estimates of characteristics for objects from each cluster that result from each stage (each execution of process 700 and/or process 800) can be shared among clusters at the end of each stage. These characteristics may include estimates of building heights, building materials, foliage heights, and/or foliage material types, etc.

In one embodiment, process 300 (e.g., which may included processes 400, 500, 600, and 700), can be used to estimate characteristics for a large number of objects, such as buildings 104 and foliage regions 105 (e.g., building height, building materials, foliage, and foliage material). The characteristics of the objects in an environment may be estimated with fewer than all the steps described in processes 300 through 800.

In another embodiment, process of 300 (e.g., which may include processes 400 through 800) can be used to estimate other characteristics of environment 100, such as ducting conditions. Ducting conditions may include variations (often vertical) of the speed of electromagnetic wave propagation that may results in "bounces" and/or "shadow zones" of signal strength at various distances from the transmitter. In other words, the atmosphere itself in environment 100 may be considered an object as described above. In one embodiment, ducting conditions (e.g. the characteristics of the atmosphere treated as an object) may be identified by a vertical refractivity profile.

Figure 9:
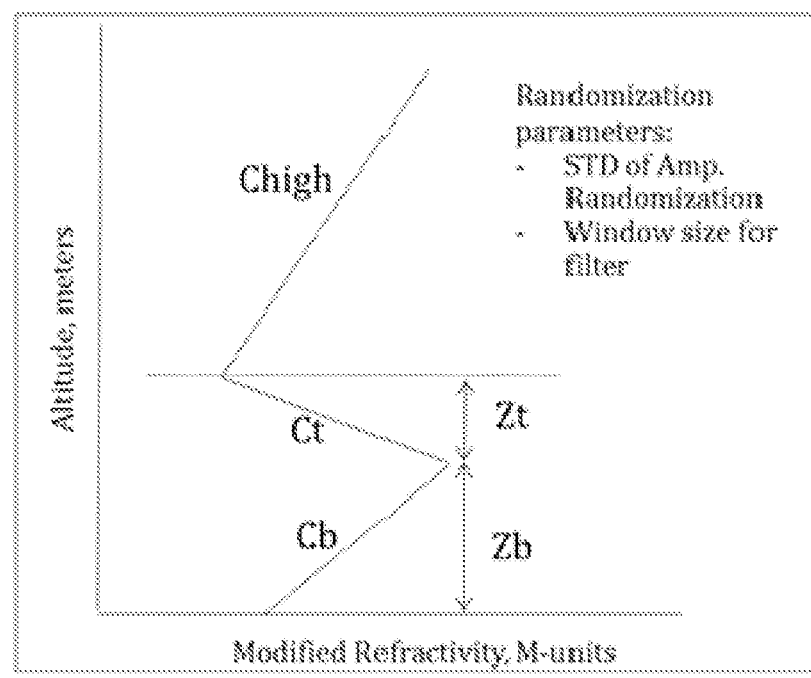
FIGS. 9 and 10 are charts of exemplary refractivity profiles.
Figure 10:
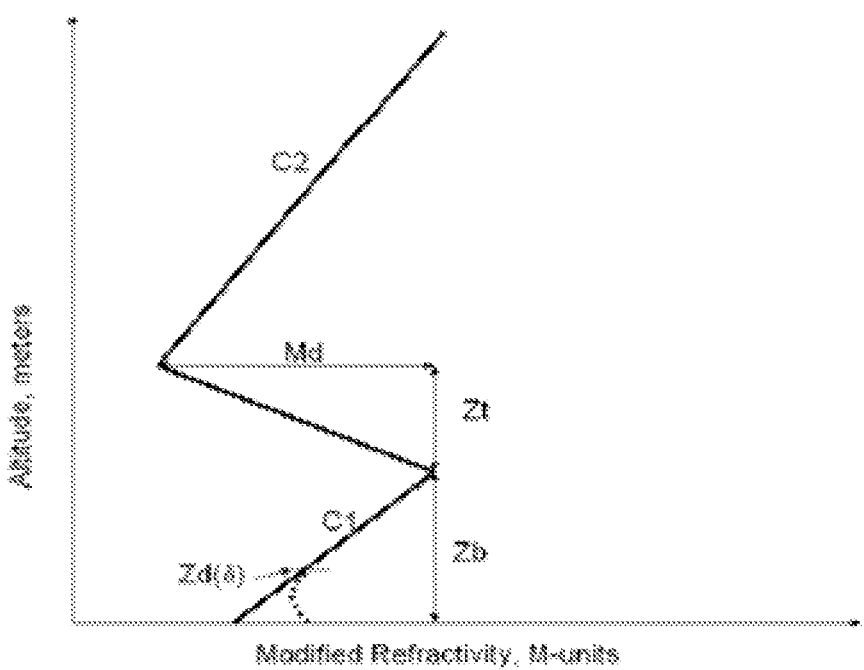

A refractivity profile may describe the speed of electromagnetic wave propagation as a function of altitude. This refractivity profile can be described using a small number of characteristics (e.g., eight). Two exemplary sets of characteristics of the refractivity profile are shown in FIGS. 9 and 10. In one embodiment, the vertical refractivity profile (FIG. 9) may be defined using five characteristics. In another embodiment, the vertical refractivity profile (FIG. 10) is defined using six characteristics. In another embodiment, two additional characteristics can be added to either approach. The first can be a smoothing characteristic (using a filter, such as an FIR filter applied to the vertical profile) to correlate or to smooth the refractivity profile values over a certain altitude. The second characteristic that can be added is a randomization or fluctuation characteristic that ma add a variance to the smooth, piece-wise linear profiles of FIGS. 9 and/or 10. In this embodiment, the parameters chosen to describe the vertical refractivity profile can be estimated using the processes described previously (instead of estimating building characteristics, for example). Characteristics may include: base height ($Z_b$), inversion layer thickness ($Z_t$), mixed layer slope in M-units per distance ($C_1$), evaporative duct height (delta), M-deficit ($M_d$) in M units, and slope above the inversion layer ($C_2$) in M-units per unit distance.

In addition to a fit metric (block 808 and/or block 812), an ambiguity metric can be calculated for various sets of characteristics (e.g., "solutions") used to describe the objects in environment 100. Ambiguity metrics can be calculated at various stages. In one embodiment, ambiguity metrics of a solution (e.g., a set of characteristics) can be calculated at each stage (each complete execution of process 700 and process 800), and ambiguity metrics of a solution can be calculated for each class of solution (each set of parameters used to describe the progression of parameter offsets in the execution of the multiple passes of process 700 and process 800). In one embodiment, the ambiguity metric can be used to determine whether a clear solution (e.g., less ambiguous or unambiguous solution) is identified at each stage, and whether a clear solution (e.g., less ambiguous or unambiguous solution) is identified among various classes.

Various ambiguity metrics can be used to identify whether a clear solution is identified among classes and at each stage. The ambiguity metric may compare the overlap in fit metric from the best M solutions (where M is an integer) between stages, between solutions in different classes, or among other groupings of solutions. As an example, an ambiguity metric may be obtained by comparing the overlap of the distribution of a set of fit metrics from two different groups of solutions (either at subsequent stages, among different classes, or among other groups of solutions). In one embodiment, the ambiguity metric may be obtained in three steps to determine an "overlap metric." The first step may calculate the percentage of fit metric values in the first group that lie within the full range of fit metric values in a second group. The second step may calculate the percentage of fit metric values in the second group that lie within the full range of fit metric values in the first group. The third step may calculate the average of the results of the previous two steps.

In another embodiment, the ambiguity metric can be calculated for a "separability metric" as the difference between the mean, median, or mode of the fit metric distributions of groups one and two, normalized by the standard deviation or variance of either group of fit metric groups, or an average or other combination of the standard deviation or variance of the two fit metric groups. Other measurements of distribution separability can be used in the calculation of an ambiguity metric, with the basic goal of determining how much overlap, or alternatively, how much separation exists between two sets of fit metrics from two different groups of solutions.

The ambiguity metrics described can be used to determine whether a solution is an unambiguous solution, compared to another group of solutions. In one embodiment, the 'overlap metric' described previously can be compared to a threshold to determine if overlap is reduced enough to consider a solution unambiguous. In another embodiment, the 'separability metric' can be compared to a threshold to determine if the separability between two solutions is adequate to consider the solution unambiguous. In yet another embodiment, both the 'overlap metric' and the 'separability metric' can both be compared to thresholds, or can be applied to other logic, to determine whether a given solution is unambiguous. If the result is not unambiguous, notification can be given that the best solution provided by block 816 of process 800 may not unambiguously define a 'good' solution for an estimate of the characteristics of the objects in environment 100.

The fit metrics described previously can be used to determine whether a best solution is well matched to the solution space considered for the objects in environment 100. The best fit metric provided in process 800 (block 816) can be compared to thresholds and to other solution fit metrics to determine whether an adequately low fit metric is obtained. If the best fit metric is not small enough (a small value indicating a good fit between the measurements and the expected observations for the estimates of characteristics for objects in 100), then notice can be given that a 'good fit' does not exist within the parameter space searched.

In processes 700 and 800, expected observations for a set of values of characteristics of objects in environment 100 are calculated and compared to measurements, and a search of the characteristic space results in a best estimate of the characteristics for those objects. In some cases, the objects with characteristics being estimated are a small subset of the total number of objects in environment 100. In this case, some objects in environment 100 may not have their characteristics estimated. In one embodiment, the characteristics of objects that are not estimated may already be known. In another embodiment, the characteristics of objects that are not estimated may not known but may be assumed. For example, characteristics of objects immediately outside a cluster being processed may be assumed or known.

Assumptions about the characteristics of objects not being evaluated may include the general statistics of the characteristics not being estimated or characteristics of objects that are known. For example, the average building height for buildings not being characterized may be known or assumed based on the class of those buildings. As another example, the average reflectivity of building surfaces may be known or assumed based on the class of those buildings. As yet another example, the standard deviation relative to the mean of the building heights or building reflectivities may be known or assumed based on the class of those buildings. In these cases, the influence of these non-estimated objects on the expected observations may be calculated using a statistical propagation model to augment a deterministic model in the propagation simulator 216. A statistical propagation model, such as the ITU-R P.1441 propagation model identified by the International Telecommunications Union can be used to account for effects of objects and their assumed or known statistical properties in areas outside of the area that includes objects whose characteristics are being estimated.

The sequence of steps or blocks defined in process 700 and/or process 800 may be varied or changed. For example, the point at which the characteristic value delta is changed (e.g., block 714 and/or block 814) may be at another point in process 700 or process 800. Other variations in the ordering of the steps, or in the omission of certain steps, are allowed in process 800 and/or process 700.

In one embodiment, when the characteristic value delta is calculated or changed (e.g., block 714 of process 700 or block 814 of process 800), the new value can be used to update one characteristic or multiple characteristics (e.g., in block 702 of process 700 or block 802 of process 800). For example, a delta value can be applied to offset one value of a characteristic of one object in positive and negative directions for the next set of characteristic values and/or calculations. In another embodiment, a delta value can be applied to offset more than one value of characteristics of one or more objects in positive and negative directions for the next set of calculations. In another embodiment, different delta values can be defined for different characteristics, with one or multiple values of characteristics changed for the next set of values and/or calculations, in either or both positive or negative directions.

In one embodiment, process 700 (block 710) may stop looping (e.g., cessation of loop 752) after a particular number of sets of values of characteristics. In another embodiment, process 700 (block 710) may stop looping (e.g., cessation of loop 752) after the characteristic space has been completely searched by some definition of the span of the characteristic space.

In one embodiment, process 700 (block 714) may stop looping (cessation of loop 754) after a particular number of loops. In another embodiment, process 700 (block 714) may stop looping (e.g., cessation of loop 752) after changes in the fit metrics are reduced to an acceptably low level from pass to pass, or until the fit metric achieves an acceptably low level in absolute terms. In yet another embodiment, process 700 (block 714) may stop looping (cessation of loop 754) after the delta value defined reaches an acceptably small value.

In one embodiment, process 800 (block 810) may stop looping (e.g., cessation of loop 852) after a particular number of sets of values of characteristics. In another embodiment, process 800 (block 810) may stop looping (e.g., cessation of loop 852) after the characteristic space has been completely searched by some definition of the span of the characteristic space.

In one embodiment, process 800 (block 814) may stop looping (cessation of loop 854) after a particular number of loops. In another embodiment, process 800 (block 814) may stop looping (e.g., cessation of loop 852) after changes in the fit metrics are reduced to an acceptably low level from pass to pass, or until the fit metric achieves an acceptably low level in absolute terms. In yet another embodiment, process 800 (block 814) may stop looping (cessation of loop 854) after the delta value defined reaches an acceptably small value.

In one embodiment, the clustering algorithm used in process 400 (block 404) may include a single-linkage hierarchical clustering algorithm. Other clustering algorithms may be used.

In one embodiment of process 800, the selection of which characteristics to include in estimates of characteristics of objects (block 816) may be done by adaptively setting a threshold to the fit metrics that were recorded. A test may be applied to the distribution of the fit metrics in order to identify the lowest 'group' or 'mode' of values in the fit metric distribution. Alternatively, a certain percentage of values in the fit metrics may be identified to select a certain lowest set of values in the fit metric distribution. Other means may be applied to determine a set of the fit metric values in the fit metric distribution. Based on this selection, a threshold may be set in terms of fit metric values. This threshold may be used to identify the sets of characteristics, previously stored, that are associated with fit metric values below the threshold, or between two limits. In this way, a set of characteristic values may be identified for the objects. The values may be combined by taking the mean, the median, the maximum, the minimum, or some other combination of the resulting object characteristics to produce a 'best estimate' of the objects.

Process 400 (block 304) may calculate the expected observations using propagation simulator 216 (e.g., in server 134). Once the expected observations are calculated for a specific transmitter (e.g., knowing the location), receiver (e.g., knowing the location), characteristic set or objects in environment 100, set of values for the characteristics for objects in environment 100, and/or transmitter-receiver pair bias, the value and/or values may be stored (e.g., in memory 2112) for further use, possibly avoiding recalculation. When the same or similar expected observations are to be calculated (e.g., at some point in the future), these expected observations may be retrieved from memory 212 to avoid additional processing.

A matrix was described to provide an example of the organization of the relationship or association of expected observations and object characteristics in process 400 (e.g., block 404). The data structure can be a matrix with the described organization, can be a different matrix (e.g. the transpose), and/or can be another data structure which provides the ability to conduct the same functions (e.g., similarity comparison and cluster processing) as described above.

In one embodiment, a method may include receiving 2D geometry data (e.g., a 2D footprint) of buildings and foliage regions. The method may include receiving signals using one or more radio frequency receivers over one or more positions. The method may include estimating the heights of buildings and foliage, estimating the material types of buildings and foliage, estimating local atmospheric conditions such as vertical profiles of refractivity that may cause ducting.

In one embodiment, the method may include receiving 2D geometry data (e.g., a 2D footprint) of buildings, and receiving 2D geometry data (e.g., 2D footprints) of foliage regions. The method may include receiving signals using one or more radio frequency receivers over one or more positions, and recording the signal power level measurements of the received signals. The method may include receiving estimated positions of the receivers and the time of the measurements, receiving or knowing transmitter location, estimating the height of the buildings, estimating the material types for each building, estimating the height of foliage, and/or estimating the material type characteristics for the foliage.

In one embodiment, a method may include receiving signals using one or more radio frequency receivers over one or more positions, recording signal power level measurements of the received signals, receiving estimated relative positions of the transmitters and receivers at the time of the measurements, and estimating one or more profiles of the local vertical refractivity from the measurements, where each vertical profile is associated with a relative geographic position.

In one embodiment, the methods described herein may include a method of searching to evaluate how well expected observations (e.g., replica vectors) match received signal measurements for various building parameters, foliage parameters, and/or vertical refractivity profiles in an efficient manner. The methods described herein may include identifying which building height and material parameters are associated with each radio measurement, identifying which foliage height and material parameters are associated with each radio measurement, organizing large numbers of building height and material parameters, and foliage height and material parameters, into a number of smaller groups of parameters. The methods described herein may include identifying and removing unnecessary radio frequency signal measurements from the process to reduce errors and accelerate the process. In one embodiment, the identification and removal may include the identifying and removing certain building parameters, foliage parameters, and ducting profile parameters that cannot be adequately estimated from the expected observations (e.g., expected observations).

Methods described herein may include estimating a link bias (e.g., a link including a transmitter-receive pair) value (e.g., a constant for a period of time) for each transmitter-receiver link pair. The method may include estimating how well the estimates of building heights and materials, foliage heights and materials, and vertical refractivity profiles match the observed radio measurements. The method may include estimating whether the estimates of building heights and materials, foliage heights and materials, and vertical refractivity profiles are an unambiguous match to the received radio measurements.

Methods described herein may include splitting (e.g., grouping or clustering) the estimation process into multiple groups of building and foliage structures to conduct the process in a partially independent manner before combining results from each group of structures, and/or conducting the estimation process in stages where the fidelity of the overall picture of buildings and foliage improves in each stage and results from each group are shared between stages.

In one embodiment, the location or position of the receiver of a navigation unit may be corrected. The method may include estimating one section of building and foliage parameters in a deterministic manner, while estimating surrounding building and foliage parameters in a statistical sense. The method described herein may include receiving 2D geometry data (e.g., footprint and coarse (e.g., inexact) 3D geometry data such as height) for buildings and foliage. Methods described herein may include updating the estimated bias for each link over time. The method may include detecting change in settings or activities of a mobile receiver that may cause a shift in the receiver link bias associated with that receiver and calculating the bias at those times, for example.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While a series of blocks has been described with regard to the processes illustrated and described, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code, it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
  receiving signals in a receiver, wherein the signals include electromagnetic waves having propagated from at least one transmitter through space including a plurality of objects;

recording corresponding observations associated with the received signals, wherein the observations include power levels of the corresponding received signal;

determining expected observations of the signals corresponding to the recorded observations, wherein determining the expected observations includes determining the expected observations based on a propagation model of characteristics of the plurality of objects;

comparing the expected observations with the recorded observations; and estimating characteristics of the plurality of objects based on the comparing of the expected observations with the recorded observations, wherein the estimated characteristics of the plurality of objects indicate a speed that electromagnetic waves propagate through the plurality of objects, wherein estimating characteristics of the plurality of objects includes estimating an indication of a base height or an indication of an M-deficit.

2. The method of claim 1, wherein determining the expected observations includes:

determining sensitivities of the expected observations with respect to the characteristics; and determining the characteristics with less influence on the expected observations, wherein determining the expected observations includes determining the expected observations based on the determination of the characteristics with less influence.

3. The method of claim 2, further comprising:

estimating the characteristics associated with the expected observations;

identifying the expected observations associated with identical characteristics;

identifying characteristics with less influence on the expected observations for removal;

determining a bias associated with a transmitter-receiver pair associated with the recorded observations; and determining the expected observations based on the bias and the characteristics associated with the expected observations.

4. The method of claim 3, wherein determining the bias includes:

selecting a plurality of sets of values for the characteristics associated with the expected observations;

calculating the expected observations for each set of values for the transmitter-receiver pair;

calculating a difference between the expected observations for each set of values and the recorded observations;

determining the set of values with best fit to the recorded observations; and calculating the bias based on the set of values with best fit, wherein the bias indicates a combined transmit power and receiver gain characteristics of the corresponding recorded observation.

5. The method of claim 4, wherein determining the characteristics includes:

selecting a plurality of sets of values for the characteristics associated with the expected observations;

calculating the expected observations for each set of values for a transmitter-receiver pair based on the bias;

calculating a difference between the expected observations for each set of values and the recorded observations; and determining the set of values with best fit to the recorded observations.

6. The method of claim 1, wherein estimating the characteristics of the plurality of objects includes grouping characteristics of the plurality of objects into a first cluster and a second cluster, first estimating the characteristics in the first cluster, and estimating characteristics in the second cluster based on the characteristics estimated in the first cluster.

7. The method of claim 1, wherein estimating the characteristics of the plurality of objects includes estimating the characteristics based on a type of environment, wherein the type of environment includes an urban environment or a suburban environment.

8. The method of claim 1, further comprising:

calculating fit metrics or ambiguity metrics to characterize accuracy and uniqueness of a solution of the estimation of the characteristics.

9. The method of claim 1, wherein determining the expected observations includes determining the expected observations based on propagation models having different sets of propagation parameters for the plurality of objects, and wherein comparing the expected observations with the recorded observations includes comparing the expected observations to the recorded observations to determine characteristics of the plurality of objects.

10. The method of claim 9, wherein estimating characteristics of the plurality of objects includes estimating a height of a building or a height of foliage.

11. The method of claim 9, wherein estimating characteristics of the plurality of objects includes estimating a material of the building or the material of the foliage.

12. The method of claim 1, wherein determining the expected observations includes determining the expected observations based on propagation models having different sets of refractivity conditions for the plurality of objects, and wherein comparing the expected observations with the recorded observations includes comparing the expected observations to the recorded observations to determine characteristics of vertical refractivity profiles of the plurality of objects.

13. The method of claim 12, wherein estimating characteristics of the plurality of objects includes estimating an indication of: inversion layer thickness, mixed layer slope, evaporative duct height, refractivity fluctuations, smoothing of profile, or M-deficit slope.

14. A device comprising:

a receiver to receive signals from at least one transmitter, wherein the signals include electromagnetic waves having propagated from at least one transmitter through space including a plurality of objects;

a memory to record observations associated with corresponding received signals, wherein the observations include power levels of corresponding signals;

a processor to:

determine expected observations of the signals corresponding to the recorded observations, wherein determining the expected observations includes determining the expected observations based on a propagation model of characteristics of the plurality of objects;

compare the expected observations with the recorded observations; and estimate characteristics of the plurality of objects based on the comparing of the expected observations with the recorded observations, wherein the estimated characteristics of the plurality of objects indicate a speed that electromagnetic waves propagate through the plurality of objects and indicate a base height or an M-deficit.

15. The device of claim 14, wherein the processor is configured to:
   select a plurality of sets of values for the characteristics associated with the expected observations;
   calculate the expected observations for each set of values for the transmitter-receiver pair based on the bias;
   calculate a difference between the expected observations for each set of values and the recorded observations;
   determine the set of values with best fit to the recorded observations; and
   group characteristics of the plurality of objects into a first cluster and a second cluster, first estimating the characteristics in the first cluster, and estimating characteristics in the second cluster based on the characteristics estimated in the first cluster.

16. The device of claim 15, wherein the processor is configured to:
   determine sensitivities of expected observations with respect to the characteristics;
   determine the characteristics with less influence on the expected observations; and
   determine the expected observations based on the determination of the characteristics with less influence;
   estimate the characteristics associated with the expected observations;
   identify the expected observations associated with identical characteristics;
   identify characteristics with less influence on expected observations for removal;
   determine a bias associated with a transmitter-receiver pair associated with the recorded observations; and
   determine the expected observations based on the bias and the characteristics associated with the expected observations.

17. The device of claim 16, wherein the processor is configured to:
   select a plurality of sets of values for the characteristics associated with the expected observations;
   calculate the expected observations for each set of values for the transmitter-receiver pair;
   calculating a difference between the expected observations for each set of values and the recorded observations;
   determine the set of values with best fit to the recorded observations; and
   calculate the bias based on the set of values with best fit, wherein the bias indicates a combined transmit power and receiver gain characteristics of the corresponding recorded observation.

18. The device of claim 14,
   wherein the processor is configured to determine the expected observations based on propagation models having different sets of refractivity conditions for the plurality of objects, and
   wherein the processor is configured to compare the expected observations to the recorded observations to determine characteristics of the plurality of objects.

19. The device of claim 18, wherein the processor is configured to estimate the characteristics of the plurality of objects by estimating a height of a building, a material of the building, a height of foliage, or a material of the foliage.

* * * * *